US00RE43047E

(19) United States
(12) Reissued Patent
Valloppillil

(10) Patent Number: US RE43,047 E
(45) Date of Reissued Patent: Dec. 27, 2011

(54) MMS BASED PHOTO ALBUM PUBLISHING SYSTEM

(75) Inventor: Vinod Valloppillil, Foster City, CA (US)

(73) Assignee: Openwave Systems Inc., Redwood City, CA (US)

(21) Appl. No.: 12/625,137

(22) Filed: Nov. 24, 2009

Related U.S. Patent Documents

Reissue of:
(64) Patent No.: 7,302,254
Issued: Nov. 27, 2007
Appl. No.: 10/365,054
Filed: Feb. 11, 2003

U.S. Applications:
(60) Provisional application No. 60/424,733, filed on Nov. 8, 2002.

(51) Int. Cl.
*H04B 1/38* (2006.01)
*H04N 5/225* (2006.01)
*H04N 5/232* (2006.01)
*G06F 15/16* (2006.01)

(52) U.S. Cl. ..... 455/414.1; 348/207.1; 348/211.2; 709/201; 709/231; 709/217; 709/219; 455/566; 455/466

(58) Field of Classification Search ..... 348/207.1, 348/211.2; 709/201, 231, 217–219; 455/566
See application file for complete search history.

(56) References Cited

U.S. PATENT DOCUMENTS 5,630,060 A * 5/1997 Tang et al. ..... 709/238
5,784,001 A 7/1998 Deluca et al.
5,794,142 A 8/1998 Vanttila et al.
5,941,946 A 8/1999 Baldwin et al.
6,038,295 A 3/2000 Mattes
6,133,985 A 10/2000 Garfinkle et al.
6,456,854 B1 9/2002 Chern et al.
6,487,602 B1 11/2002 Thakker
6,612,488 B2 9/2003 Suzuki
6,718,168 B2 * 4/2004 Ala-Luukko et al. ..... 455/412.1
6,728,530 B1 4/2004 Heinonen et al.

(Continued)

FOREIGN PATENT DOCUMENTS

EP 0 993 165 A2 4/2000

(Continued)

OTHER PUBLICATIONS

Press Release: "FunMail officially launches its MMS service on NTT DoCoMo's i-mode", May 21, 2002.*

(Continued)

*Primary Examiner* — Marivelisse Santiago Cordero

(57) ABSTRACT

An MMS publishing system comprises a management tool, an authoring tool, a storage facility, a message router, and a rendering server. The management tool authenticates a first user by using a telephone number of the first user as a user ID. The authoring tool allows the first user to associate rich media content with his telephone number. The content is then stored in the storage facility in association with his telephone number. Subsequently, the message router intercepts an MMS message sent from a mobile device over a wireless network when the MMS message includes a predetermined indicator and indicates the telephone number of the first user as a destination. The rendering server then accesses the stored content associated with the telephone number and sends the content to the mobile device, for output to a user of the mobile device.

18 Claims, 17 Drawing Sheets

U.S. PATENT DOCUMENTS

| | | | | |
|---|---|---|---|---|
| 6,738,636 | B2 * | 5/2004 | Lielbriedis | 455/466 |
| 6,795,711 | B1 * | 9/2004 | Sivula | 455/466 |
| 6,832,102 | B2 * | 12/2004 | I'Anson | 455/556.1 |
| 2001/0034225 | A1 | 10/2001 | Gupte et al. | |
| 2001/0037381 | A1 * | 11/2001 | Vau | 709/219 |
| 2001/0056473 | A1 | 12/2001 | Arneson et al. | |
| 2002/0016174 | A1 | 2/2002 | Gibson et al. | |
| 2002/0026289 | A1 | 2/2002 | Kuzunuki et al. | |
| 2002/0042277 | A1 | 4/2002 | Smith | |
| 2002/0047916 | A1 * | 4/2002 | Miyagi et al. | 348/384.1 |
| 2002/0052912 | A1 | 5/2002 | Griswold et al. | |
| 2002/0055350 | A1 | 5/2002 | Gupte et al. | |
| 2002/0057678 | A1 | 5/2002 | Jiang et al. | |
| 2002/0115446 | A1 | 8/2002 | Boss et al. | |
| 2002/0126708 | A1 | 9/2002 | Skog et al. | |
| 2003/0003935 | A1 | 1/2003 | Vesikivi et al. | |
| 2003/0053608 | A1 * | 3/2003 | Ohmae et al. | 379/93.25 |
| 2003/0078058 | A1 | 4/2003 | Vatanen et al. | |
| 2003/0097410 | A1 * | 5/2003 | Atkins et al. | 709/206 |
| 2003/0135463 | A1 | 7/2003 | Brown et al. | |
| 2003/0135569 | A1 | 7/2003 | Khakoo et al. | |
| 2003/0145037 | A1 | 7/2003 | Von Garssen | |
| 2003/0172121 | A1 | 9/2003 | Evans et al. | |
| 2003/0200268 | A1 * | 10/2003 | Morris | 709/206 |
| 2003/0211856 | A1 | 11/2003 | Zilliacus | |
| 2003/0212601 | A1 | 11/2003 | Silva et al. | |
| 2004/0024846 | A1 | 2/2004 | Randall et al. | |
| 2004/0066419 | A1 * | 4/2004 | Pyhalammi | 345/864 |
| 2004/0075675 | A1 | 4/2004 | Raivisto et al. | |
| 2004/0087300 | A1 | 5/2004 | Lewis | |
| 2004/0092272 | A1 | 5/2004 | Valloppillil | |
| 2004/0092273 | A1 | 5/2004 | Valloppillil | |
| 2004/0117255 | A1 | 6/2004 | Nemirofsky et al. | |
| 2004/0132431 | A1 | 7/2004 | Vandermeijden et al. | |
| 2004/0203970 | A1 | 10/2004 | Rooke et al. | |
| 2005/0162518 | A1 * | 7/2005 | Furon et al. | 348/207.1 |
| 2005/0193078 | A1 | 9/2005 | Jordan, Jr. | |

FOREIGN PATENT DOCUMENTS

| | | | | |
|---|---|---|---|---|
| EP | 1 148 754 | A2 | | 10/2001 |
| EP | 1187425 | A2 | | 3/2002 |
| EP | 1233599 | A2 | | 8/2002 |
| JP | 2000250854 | A | * | 9/2000 |
| JP | 2002-101369 | A | | 4/2002 |
| WO | WO 01/90937 | A2 | | 11/2001 |
| WO | WO 02/089448 | A2 | | 11/2002 |

OTHER PUBLICATIONS

Electronic Translation JP 2000-250854.*

Harry Newton, Newton's Telecom Dictionary, "E Wear / Earth Station", p. 285, no date listed.

* cited by examiner

MMS BASED PHOTO ALBUM PUBLISHING SYSTEM

Matter enclosed in heavy brackets [ ] appears in the original patent but forms no part of this reissue specification; matter printed in italics indicates the additions made by reissue.

This application claims the benefit of U.S. Provisional patent application No. 60/424,733, filed on Nov. 8, 2002, and entitled, "MMS Based Application Server and Content Publishing System", which is incorporated herein by reference.

FIELD OF THE INVENTION

At least one embodiment of the present invention pertains to computer/communications network, and more particularly, to techniques for publishing and accessing content and accessing application services over a network using mobile devices.

BACKGROUND

Personal mobile communication/computing devices, such as cellular telephones, personal digital assistants (PDAs) and two-way pagers, have become commonplace in many countries. These devices can be collectively referred to as "mobile devices". Many of the latest generation of mobile devices provide their users with the ability to access resources on the Internet via wireless telecommunications networks (or simply, "wireless networks"). For example, some of these mobile devices allow their users to access World Wide Web pages, exchange email and download files over the Internet. Devices which can access the World Wide Web ("the Web") include a software application called a browser, which when implemented in a small (e.g., handheld) mobile device is sometimes more precisely referred to as a "minibrowser" or "microbrowser". An example of such a browser is the Openwave Mobile Browser produced by Openwave Systems Inc. of Redwood City, Calif.

A device called a gateway is often used to enable these mobile devices to do this. Typically, the gateway is (or includes) a server computer system that is coupled between the wireless network and the Internet. The gateway typically translates/converts between the languages and protocols used on the Internet and the languages and protocols used by the mobile devices. Such a gateway is included in the Openwave Mobile Access Gateway, produced by Openwave Systems Inc. The gateway is typically operated by the communications service provider (CSP), e.g., the operator of the wireless network, also sometimes called the "wireless carrier". Wireless carriers sometimes use the gateway and associated computer systems to provide additional services to their subscribers (mobile device users), such as content caching, proxying, etc. Wireless carriers also sometimes generate revenue from providing more sophisticated "value added" services and applications to their subscribers, such as location services.

Currently there is substantial interest in providing better ways for users to access published content and application services from their mobile devices. The term "content" in this context can refer to essentially any kind of information, such as text, images (e.g., graphics, photos, animations), sound, etc. One specific type of content, for example, is a Web page. There is significant interest in allowing users to browse the Web from mobile devices more efficiently. Current technology has a number of shortcomings in this regard, which discourage users from using the Web browsing capabilities of their mobile devices.

Many mobile devices use wireless access protocol (WAP) to access the Internet via wireless networks. Web pages can be sent to mobile devices as wireless markup language (WML) over WAP, for example, and displayed on the mobile devices. However, the WAP usage model for Web browsing is problematic. The problems include the fact that WAP is a synchronous protocol, that Web browsing inherently involves serial navigation, and that the Internet and wireless networks tend to have very high latencies. WAP is synchronous in that the user must wait for a response to each WAP request. This fact, combined with high network latencies and the requirement of serialize navigation, means that users have to wait repeatedly when Web browsing or accessing applications from their mobile devices, making these processes long and laborious.

For example, assume that a cellular telephone user wants to find out what the weather is currently like in Rome. Accordingly, the user starts up the browser in his cellular telephone. The user then selects an item labeled "Weather" from a menu screen displayed on the phone. This menu is managed by the carrier, which performs an "editorial" or content management function. The user then waits for several seconds while the phone sends a WAP request via the wireless network to a remote server, until the phone receives a reply that causes the phone to display the next screen. The next screen prompts the user to specify whether he wishes to identify a city by ZIP code or by name, for his request. Assume that the user chooses to specify a city by name and makes the appropriate selection. Again the user waits for several seconds, while the telephone sends another WAP request to the remote server via a wireless network, and receives a reply that causes the phone to generate yet another screen, prompting the user to enter the name of the city. The user then uses the keypad of the telephone to type in the name "Rome" and presses the enter key. Yet again, the user waits for several seconds, while another WAP request is sent by the phone over the wireless network, until finally, the current weather in Rome is displayed to the user.

It will be recognized that the foregoing is a time-consuming and tedious process, which discourages users from using the Web browsing capability of their mobile devices. It will also be recognized that this is a very simple example of Web browsing from a mobile device. A more in-depth browsing session would require a correspondingly longer and more tedious process. So, while WAP provides an effective way to publish content (e.g., web pages), it has serious disadvantages in terms of usability when accessing content.

WAP also has disadvantages from the standpoint of content availability. In the WAP model, content is normally expected to be produced by a third-party group of formal content providers, who generally require some financial incentive to produce content.

With the introduction of "3G" mobile devices, mobile devices will have a much broader range of capabilities than ever before. Consequently, it is desirable for wireless carriers to be able to provide a wider range of "value added" services and applications to their subscribers (mobile device users). Doing so would provide end users with a richer experience and would provide wireless carriers with additional ways of generating revenue. The WAP model, in addition to the above-noted shortcomings, is not well adapted to providing wireless carriers with efficient monetization opportunities. Carriers normally bill subscribers for WAP-based browsing on a per-minute or per-byte basis. This billing structure, combined with low volume of use due to the above-noted problems, translates into relatively low profit margins for wireless carriers.

On the other hand, the short messaging service (SMS) is well-adapted to efficient carrier monetization. SMS is an asynchronous person-to-person messaging protocol, by which users can exchange short messages using mobile devices such as cellular telephones. SMS is well-adapted for carrier monetization, at least partly because the infrastructure for cross-carrier tariffing and monetary settlement already exists and is in use for SMS, i.e., SMS centers (SMSCs) of different carriers are already interconnected for billing purposes. Further, SMS is usually billed on a per-message basis, at a very low rate from the perspective of most users. This billing model is also "discrete" for the user; the user is able to predict in advance exactly how much a transaction will cost and knows the unit of billing. The SMS billing model encourages a high volume of use and, therefore, leads to very high profit margins for wireless carriers (typically on the order of 90%).

Further, SMS is asynchronous, in that a user does not have to wait for a response after sending an SMS message. Because SMS is asynchronous, it is also well-adapted to use in the presence of high latency.

What is needed, therefore, is a solution that provides a powerful way for wireless subscribers to publish and access many types of content from their mobile devices, in a manner which is user friendly so as to encourage use, and which provides wireless carriers with an efficient way to derive revenue.

SUMMARY OF THE INVENTION

One aspect of the invention is a method which comprises enabling a first user to store a photo in a centrally stored photo archive associated with the first user, by the first user sending the photo in a first MMS message that includes only the photo and a predetermined indicator and that has a telephone number assigned to the first user as a destination telephone number. The method further comprises enabling a second user operating a mobile device on a wireless network to view the photo, by the second user sending from the mobile device a second MMS message that includes only a predetermined indicator and that has the telephone number assigned to the first user as a destination telephone number. In response to which the photo is sent to the mobile device for output to the second user.

Other features of the present invention will be apparent from the accompanying drawings and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Overview

Figure 1:
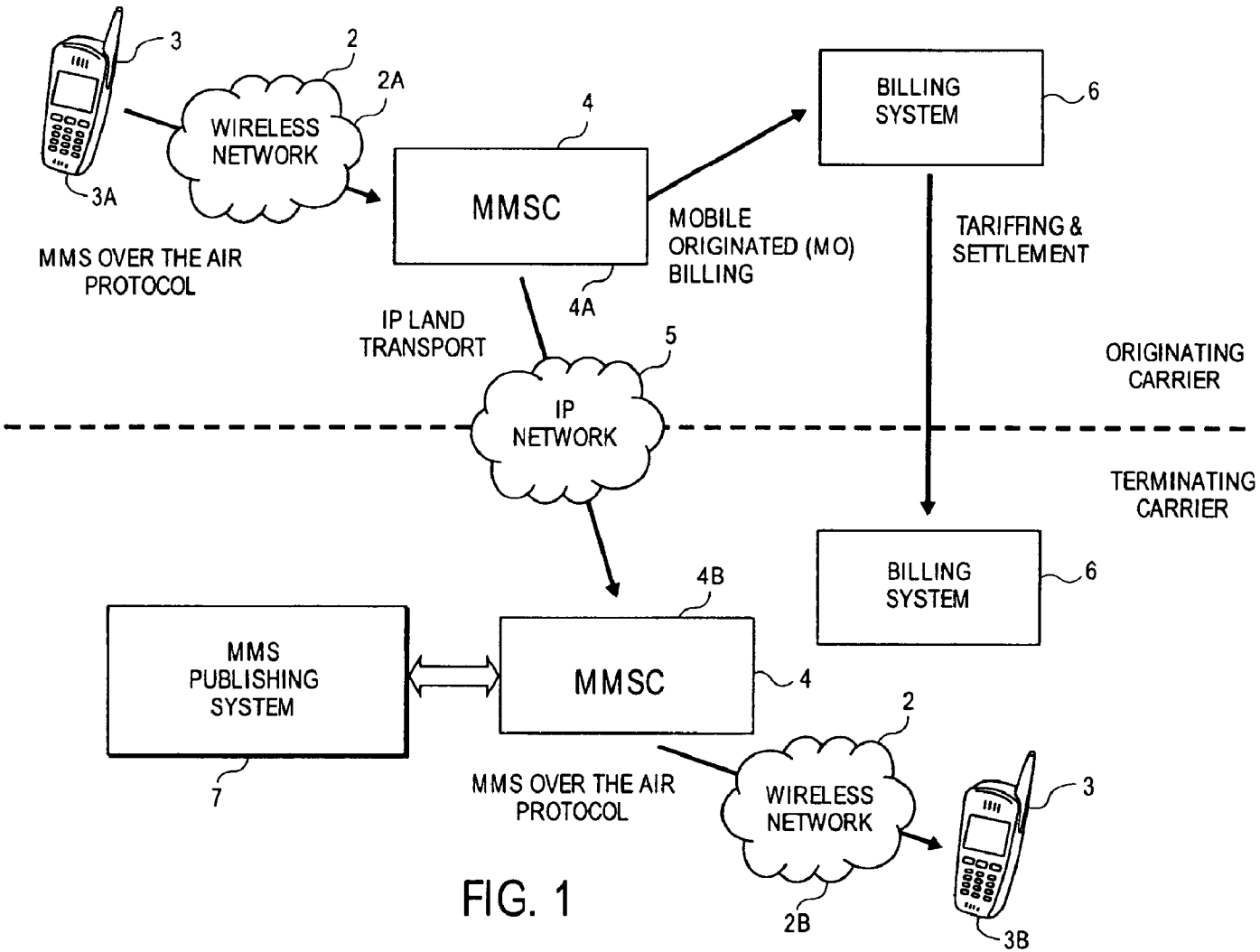
FIG. 1 shows a basic network architecture in which the invention can be implemented.

The solution described herein provides a powerful way for wireless subscribers to publish and access many types of content and to access applications from their mobile devices, in a manner which is user friendly so as to encourage use, and which provides wireless carriers with an efficient way to generate revenue from its use. The solution provides ease of publishing content, while also using an asynchronous person-to-person communication model and providing efficient monetization.

As described further below, the described solution includes a system that enables end users to use multimedia messaging system (MMS) messages to publish and access content, and to invoke applications, from their mobile devices. MMS is a 2.5 G/3 G messaging system for asynchronous person-to-person messaging, which is based on the SMS standard, but which enables communication over wireless networks of messages containing "rich media" content, i.e., content of types that tend to be much more data-intensive than text, such as such as graphics, digital photographs, video, animation, sound files, and/or audio. The solution described herein is, therefore, particularly well-suited for authoring, publishing and accessing "rich media" content from mobile devices. MMS is standardized by the WAP Forum and the Third-Generation Partnership Project (3GPP) and is described in: "WAP MMS, Architecture Overview," WAP-205, WAP Forum (Approved Version Apr. 25, 2001); "WAP MMS, Client Transactions Specification," WAP-206, WAP Forum (Approved Version Jan. 15, 2002); "WAP MMS, Encapsulation Specification," WAP-209, WAP Forum (Approved Version Jan. 5, 2002); "Requirements", 3GPP specification 22.140; and "Architecture and Functionality," 3GPP specification 23.140.

The solution includes a publishing system based on MMS (the "MMS publishing system") which is included in, or coupled to, an MMS center (Noise). In certain embodiments, the MMS publishing system includes a management tool, an authoring tool, a storage facility, a message router, and a rendering server. The management tool authenticates a first user who wishes to publish content, by using an MMS telephone number of the user as his user ID. The authoring tool allows the first user to associate rich media content with his MMS telephone number. The content is stored in the storage facility in association with the user's telephone number. A second user wishing to access the first user's content from another mobile device may then send an MMS message with a predetermined indicator to the first user's MMS telephone number. The message router in the MMS publishing system intercepts the MMS message and, based on the fact that the MMS message is directed to the first user's telephone number and includes a predetermined indicator, determines that the MMS message is intended for accessing the first user's published content. In response, the rendering server accesses the previously stored content associated with the telephone number and sends the content to the mobile device of the second user in an MMS message, for output to the second user.

Network Architecture and Usage Model

FIG. 1 shows a network architecture in which the solution can be implemented. The network architecture includes one or more wireless networks 2, each providing wireless communications for a number of mobile devices 3. Each wireless network 2 may be operated by different wireless carrier. As stated above, the solution is based upon MMS messaging. Hence, each wireless network 2 is connected to an MMSC 4. Each MMSC 4 may be operated by a wireless carrier, although that is not necessarily the case. To facilitate description, however, it is henceforth assumed herein that each MMSC 4 is operated by a wireless carrier. The MMSCs 4 are connected by an Internet protocol (IP) based network 5, such as the Internet. Each MMSC 4 has a billing system 6 (which is typically computer-implemented), and the billing systems 6 of the wireless carriers are interconnected to allow tariffing and settlement between wireless carriers, for MMS messaging by their subscribers.

The user of a first mobile device 3A which operates on the wireless network 2A of a first wireless carrier (the "originating carrier" in this case) may send a standard MMS message to the user of a second mobile device 3B operating on a wireless network 2B of another carrier (the "terminating carrier" in this case). The mobile devices 3 may be, for example, 3G MMS-capable cellular telephones. Operation of the network for purposes of standard MMS messaging is substantially similar to SMS messaging. That is, the MMS message is addressed using the MMS telephone number of the intended recipient (the "destination telephone number"), which may be simply the telephone number assigned to the recipient's cellular telephone. The MMS message is initially transmitted from the sender's mobile device 3A over the originating carrier's wireless network 2A to the originating carrier's MMSC 4A, then from the originating carrier's MMSC 4A over the P network 5 to the terminating carrier's MMSC 4B, and then from the terminating carrier's MMSC 4B over the terminating carrier's wireless network 2B to the recipient's mobile device 3B.

An MMS publishing system 7 such as mentioned above is connected to (or included in) the MMSC 4B of the terminating carrier. In practice, any MMSC 4 may have an MMS publishing system 7, since for any given message, an MMSC 4 may be the originating MMSC, the terminating MMSC, or an intermediary MMSC. Thus, in practice a network configuration may include two or more MMS publishing systems 7, each connected to a different MMSC 4.

In the case of standard MMS messaging, the MMS publishing system 7 need not be used. This standard MMS usage mode can be seen in FIG. 2A, in which a first user, "Bill", sends an MMS message 21 stating, "Hey What's UP" to another user, "Fred". In that case, the MMS message 21 is simply directed through the MMSCs 4A and 4B to Fred's mobile device 3B, where it is displayed to Fred. However, the MMS publishing system 7 is used for purposes of publishing and/or accessing content.

Figure 2A:
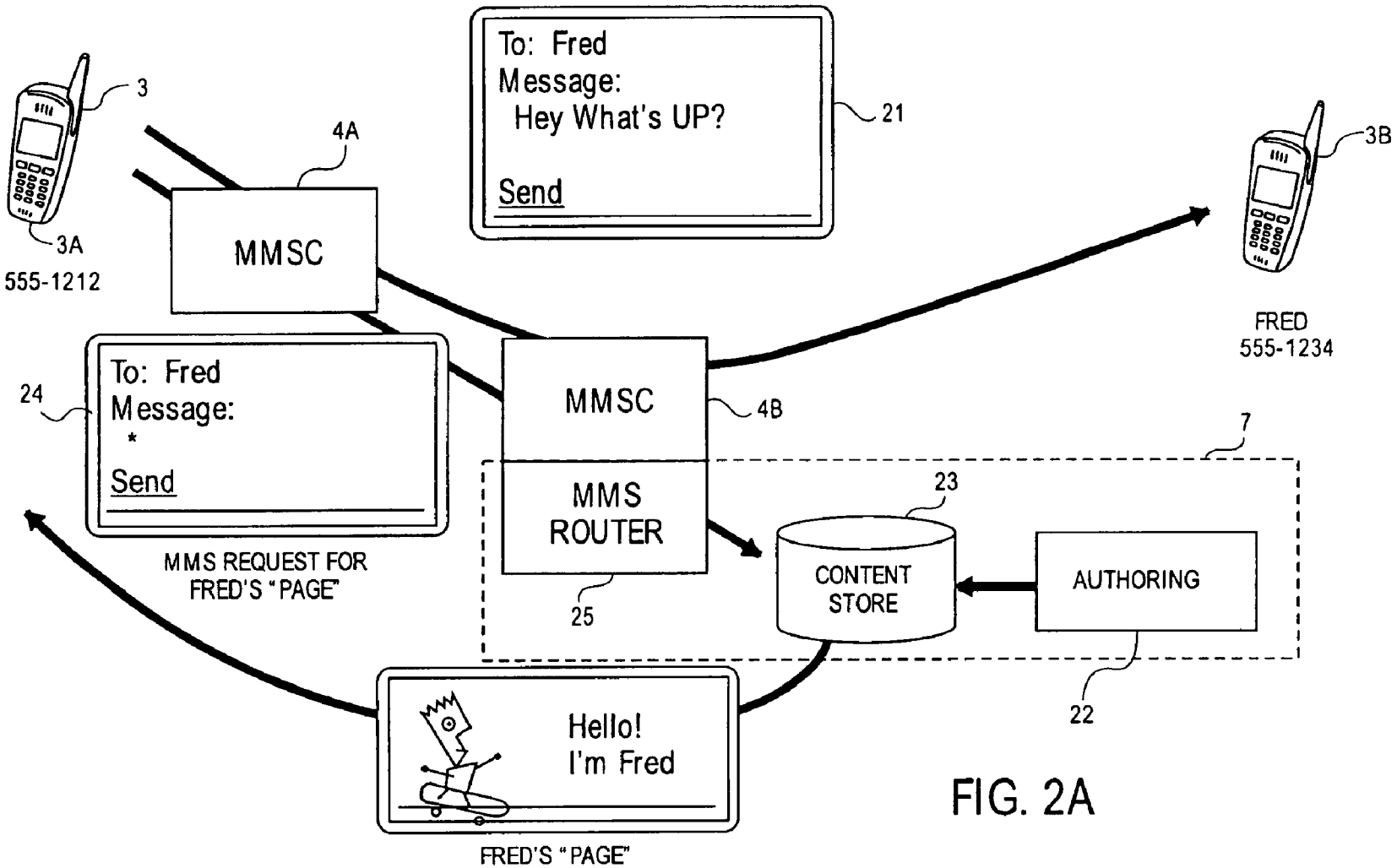
FIG. 2A illustrates a model of publishing and accessing content using MMS messaging.

Still referring to FIG. 2A, assume for example that Fred wishes to publish content, e.g. a combination of text and/or images like a web page, which Bill can access from a mobile device 3A whenever Bill wishes. Accordingly, Fred uses the authoring tool 22 of the MMS publishing system 7 to create content and place it into network storage 23. Fred then uses the publishing tool to associate the content with a control character or other type of predetermined indicator, such as the "*" character, and optionally, with one or more keywords. To facilitate description, the predetermined indicator is henceforth assumed to be the "*" character. Bill then can send an MMS request for Fred's stored published content, by sending to Fred's telephone number an MMS message 24 including the control character, "*". The "*" character (and any associated keywords) may be placed in any predetermined location of the MMS message 24, such as in the subject line or in the body of the message. The MMS message 24 does not need to include anything else (excluding, of course, the standard headers that are automatically added). The MMS publishing system 7 operated by the terminating MMSC 4B then intercepts this request 24, retrieves Fred's content from the content storage 23 based on the destination (Fred's) telephone number in the request 24, and returns the content to the mobile device 3A of Bill, where the content is displayed to Bill.

Figure 2B:
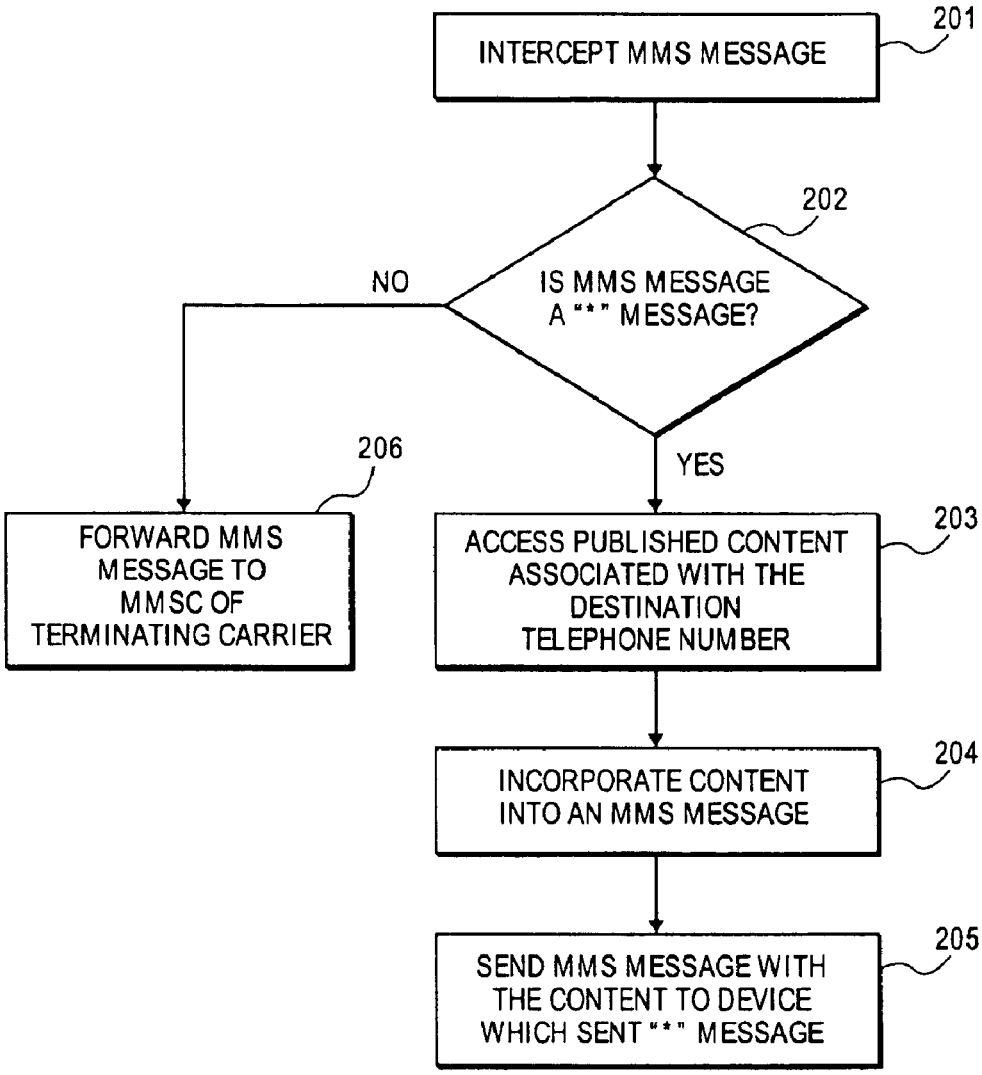
FIG. 2B is a flow diagram showing a process performed by an MMS publishing system in connection with accessing content using MMS messaging.

FIG. 2B summarizes the basic process performed by the MMS publishing system 7 in the above usage mode. Initially, at block 201 the MMS publishing system 7 intercepts an MMS message sent from a mobile device 3 over a wireless network 2. At block 202, a determination is made of whether the MMS message is a "*" message, i.e., whether the MMS message includes the "*" character (or any other predetermined indicator) in a predetermined part of the message (e.g., the subject line). If the message is not a "*" message, then it is a standard (person-to-person) MMS message, in which case the message is simply forwarded at block 206 to the MMSC 4B of the terminating carrier. If the received MMS message is a "*" message, then at block 203 the MMS publishing system 7 accesses stored content previously associated with the "destination telephone number" (the end-user telephone number to which the MMS message was addressed). The content is then rendered and incorporated into another MMS message at block 204, which is then sent at block 205 to the mobile device 3A which sent the "*" message, as a response to the "*" message.

MMS Publishing System Architecture

Figure 3:
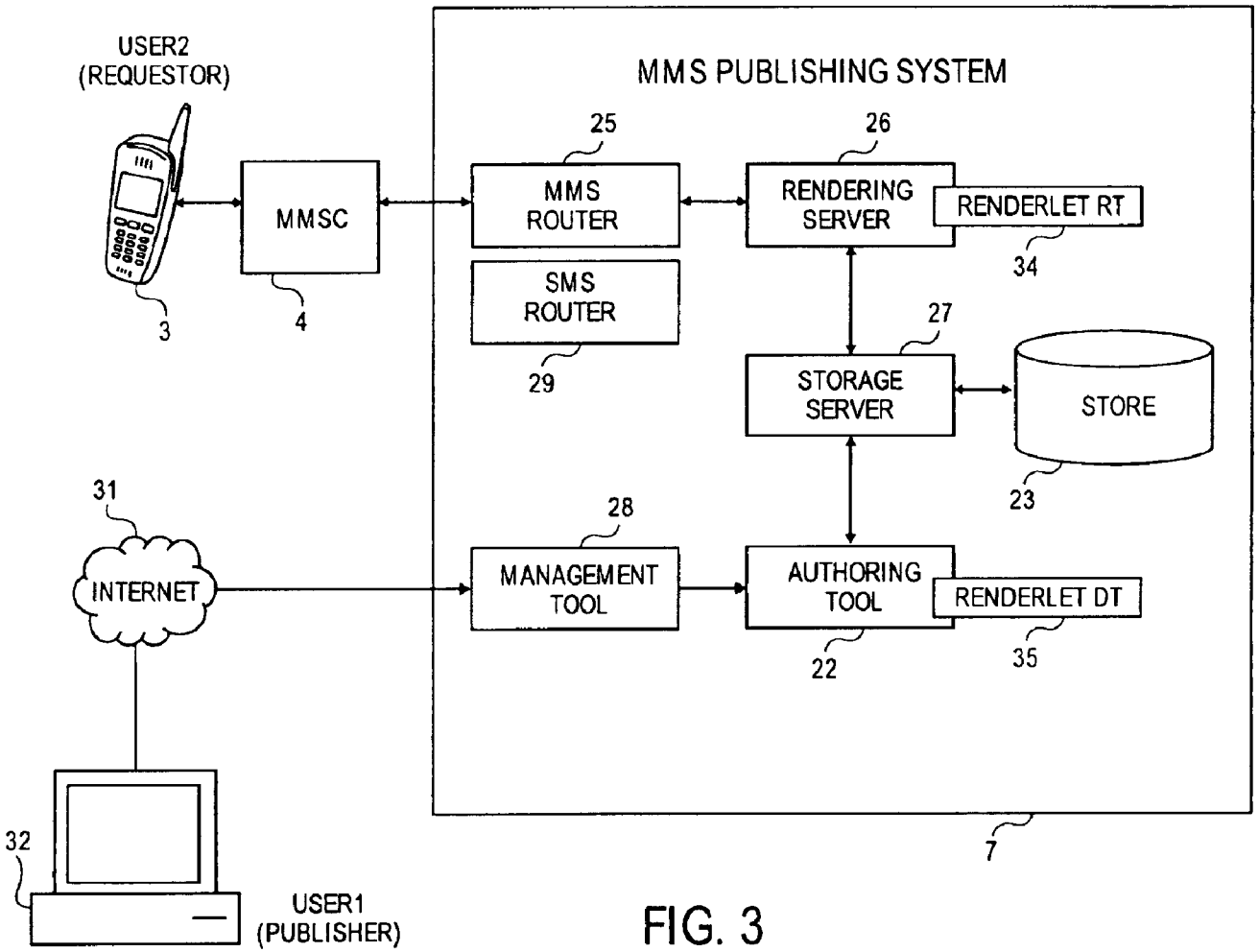
FIG. 3 illustrates the elements of the MMS publishing system, in a scenario in which content is published from a conventional PC.
Figure 4:
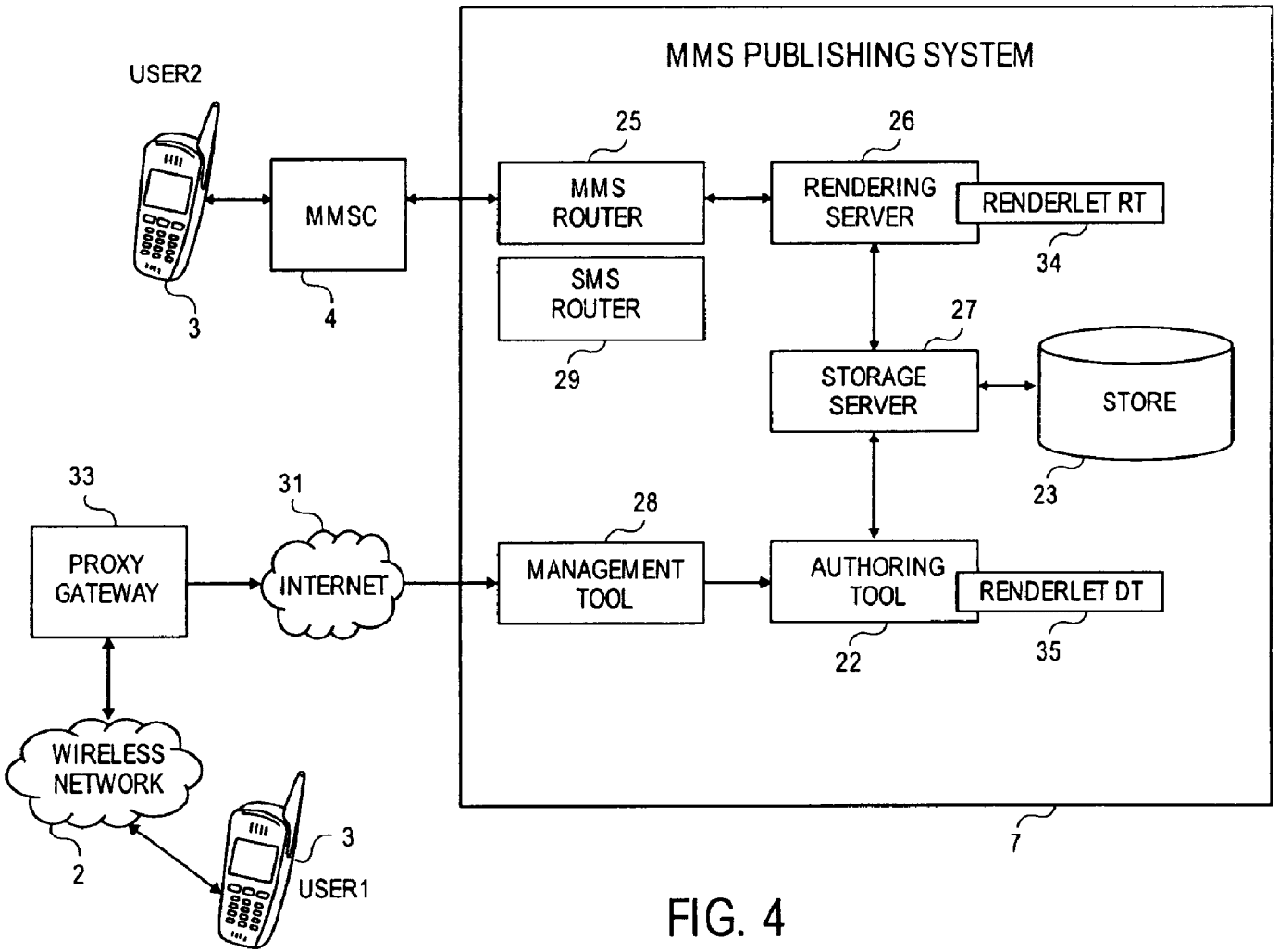
FIG. 4 illustrates the elements of the MMS publishing system, in a scenario in which a content is published from a mobile device.

FIG. 3 illustrates the elements of the MMS publishing system 7 in greater detail, according to at least one embodiment. As shown, the MMS publishing system 7 includes the authoring tool 22, the content storage facility 23, an MMS protocol router 25, (optionally) an SMS protocol router 29, a rendering server 26, a storage server 27, and a management tool 28. To facilitate description, a user who publishes content is now referred to as User 1, whereas another user who accesses the published content is referred to as User 2. As shown in FIG. 3, User 1 can access the MMS publishing system 7 via the Internet 31, from a standard desktop personal computer (PC) or other similar device 32, to publish content on the MMS publishing system 7. As shown in FIG. 4, User 1 can alternatively use a mobile device 3 on a wireless network 2 to publish content on the MMS publishing system 7, where the wireless network 2 is connected to the Internet 31 through a proxy gateway 33. In another embodiment, User 1 might upload content via MMS for publication in the publishing system 7, for example, by sending an MMS message including the content and a predetermined keyword (e.g., "*publish") to his telephone number.

In addition, the MMS publishing system may also include elements that are not shown, such as a WAP protocol router, a framework to accommodate various plug-ins to interface with and allow management of vertical applications, a reporting module to report usage of the system, and/or an operation administration and management (OA&M) module.

When User 1 wishes to publish content, the management tool 28 authenticates User 1 by using an MMS telephone number assigned to User 1 as User 1's user identifier (ID), along with a corresponding password. Once User 1 is authenticated, the authoring tool 22 allows User 1 to upload rich media content to the MMS publishing system 7 (or configure an application which is published from his telephone number), from User 1's desktop PC 32, mobile device 3 or other suitable device. The storage server 27 stores the uploaded content in the storage facility 23. The content is then logically associated in the storage facility 23 with User 1's MMS telephone number.

Subsequently, when User 2 wishes to access User 1's content from a mobile device 3, User 2 sends an MMS message that includes the "*" character to User 1's MMS telephone number. The MMS protocol router 25 in the MMS publishing system 7 intercepts this MMS message and, based on the fact that the MMS message is directed to the User 1's telephone number and includes the "*" character, determines that the MMS message is actually a request for User 1's published content, not a user-to-user message. In response to this determination, the rendering server 26 accesses User 1's stored content, renders the content and sends the rendered content to the mobile device 3 of User 2 in an MMS message (via the associated wireless networks 2 and MMSCs 4), where the content is ultimately displayed (or output in any other appropriate manner) to User 2.

Authoring and Publishing Content

Figure 5:
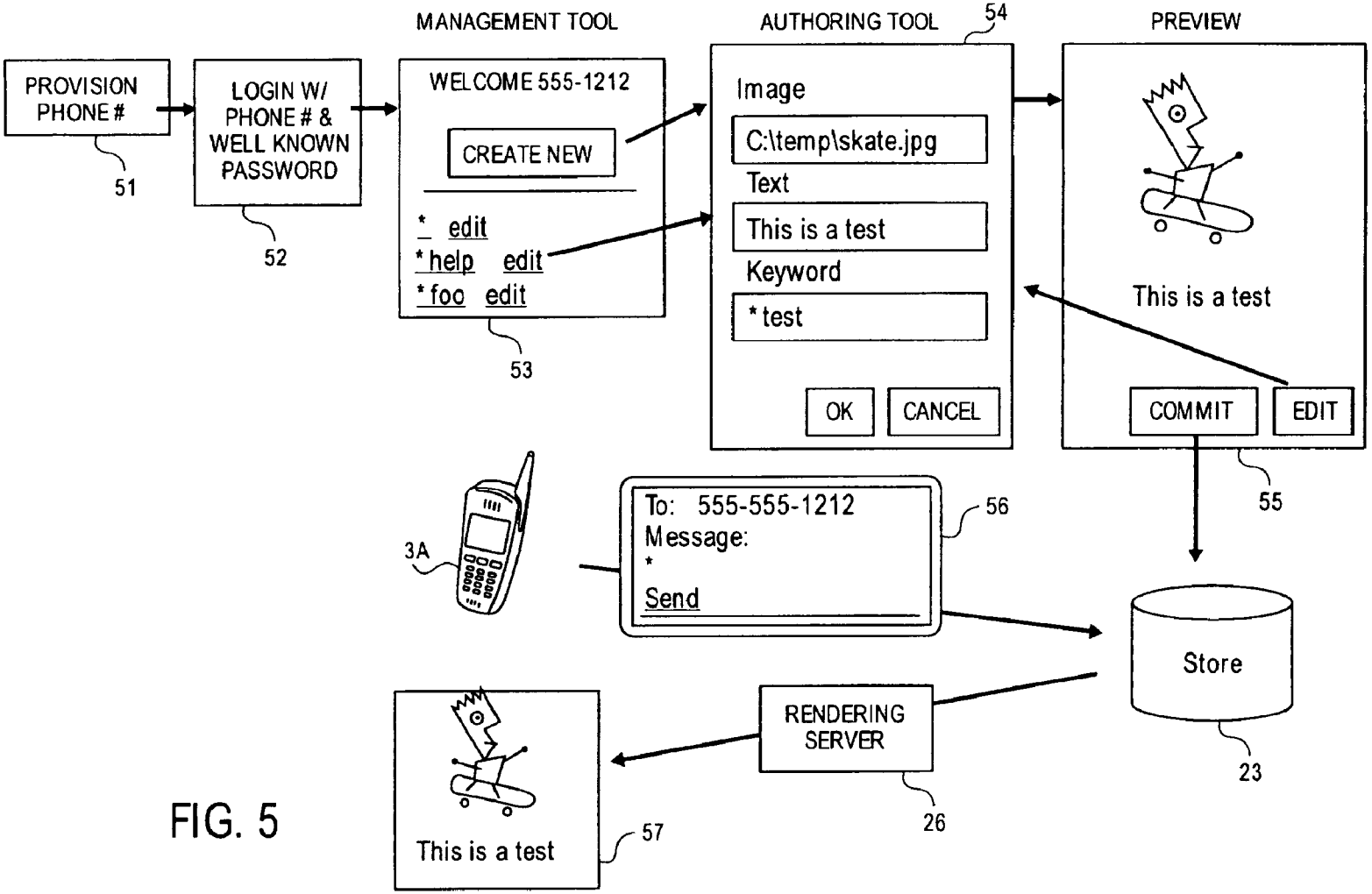
FIG. 5 illustrates a process of authoring and publishing content.

FIG. 5 illustrates the authoring and publishing process in greater detail, according to at least one embodiment. Normally, when User 1 first subscribes to a wireless service plan and acquires a cellular telephone, he is assigned a telephone number, which is his "address" in his wireless carrier's namespace. So at block 51, upon activation of the mobile device of User 1 (the publisher), the mobile device is provisioned with the telephone number. At block 52, User 1 logs in to the management tool 28 via his wireless carrier's portal, from his mobile device, a PC, or any other suitable device, entering his telephone number as a user ID. This process may be done via a simple web form. The management tool 28 then authenticates User 1 by using the telephone number as the claimed User ID and using a password entered by User 1.

Once User 1 is authenticated, the management tool presents User 1 with a welcome screen 53, which identifies User 1's telephone number and provides User 1 with various options to access the authoring tool 22. The options allow User 1 to publish new content, edit or delete already-published content, or perform other associated operations. For example, the authoring tool 22 may provide a graphical user interface 54, from which User 1 can specify a filename and path name identifying content 57 (such as an image) stored on his local device, for uploading to the MMS publishing system 7. User 1 can also associate a keyword and/or text (e.g., a title) with the content.

Once the process of uploading and/or editing is complete, User 1 is then allowed to preview and edit the content at block 55. User 1 can also tailor the content to conform to the form factors (e.g., display size) of standard mobile devices. In response to an MMS message 56 from User 2 sent to User 1's telephone number, the rendering server 26 retrieves the stored content 57 and sends it to the mobile device 3A of User 2 in an MMS message.

Certain embodiments of the MMS publishing system 7 may provide support for "renderlets". A renderlet is a component provided to end users for inclusion in dynamic MMS messages (DMMs) that they author. The rendering server 26 includes a runtime (RT) interface 34 for renderlets, and the authoring tool 22 includes a design time (DT) interface 35 for renderlets. The authoring tool 22 may provide, for example, a drop-down list of renderlets that can be selected by the publisher for inclusion in a given item of content, along with a way to input any parameters required by the selected renderlet (s). The RT interface 34 into a renderlet can support both graphical output and text-based output where necessary. For example, if a renderlet returns a number, it will be able to return the number optionally in text form or as a generated GIF image.

Three examples of renderlets that can be supported by the MMS publishing system 7 are a Fetch Image renderlet, a Counter renderlet, and a Date/Time renderlet. The Fetch Image renderlet returns a graphic image within a predetermined range of dimensions. At design time, the Fetch Image renderlet takes the fully qualified uniform resource locator (URL) to an image as an input parameter, and outputs the image. The counter Renderlet returns a monotonically increasing count of the number of times its instance was invoked. Deleting the counter from an MMS message and "saving" the MMS message, or deleting the MMS message altogether, both result in deleting a particular instance of the counter. The Date/Time renderlet returns a current date/time stamp in both graphical and text forms.

EXAMPLES OF USE

Figure 6:
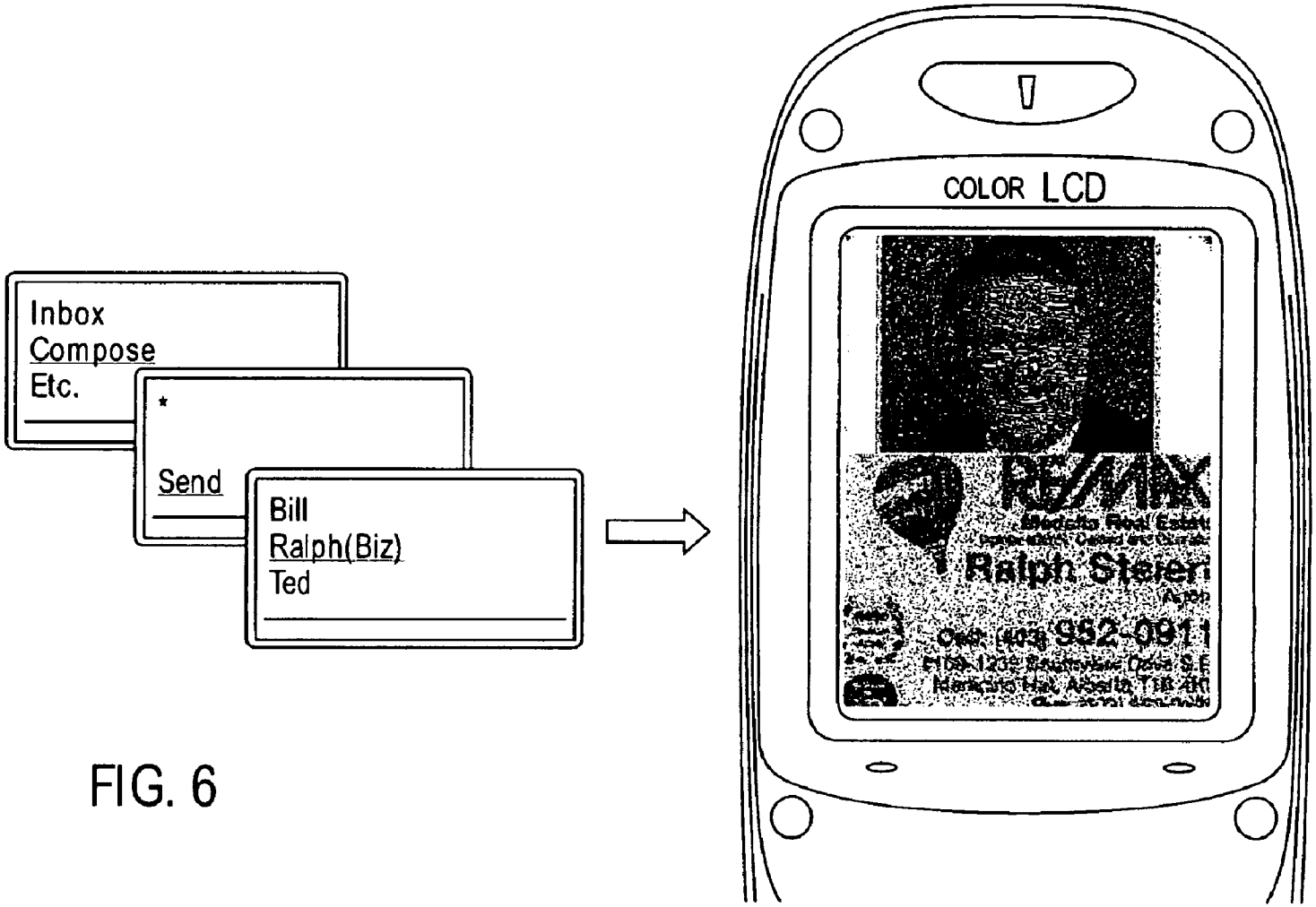
FIG. 6 illustrates an example of use of the described MMS publishing system.

FIG. 6 further illustrates an example of how the above described system can be used. Assume that a publisher, in this example a real estate agent named Ralph, uploads an image of his business card to the MMS publishing system 7 and associates it with his telephone number and the "*" character. Effectively, Ralph has now created a "home page" for his telephone number. Assume further that a client of Ralph has Ralph's telephone number stored in the address book of his mobile device but needs Ralph's address. Accordingly, Ralph's client simply composes an MMS message that includes the "*" character (a "'*' message"), using the MMS client and address book in his mobile device, and sends the "*" message to Ralph's telephone number, as shown in FIG. 6. The "*" message is detected and intercepted by the MMS publishing system 7, which responds by automatically returning the image of Ralph's business card to the mobile device of Ralph's client in an MMS message, where the image is displayed to Ralph's client.

As another example, a restaurant might post a "MMS-enabled" billboard next to a highway. The billboard is MMS-enabled in that it includes the restaurant's telephone number, in association with which the owner of the restaurant has previously published content on the MMS publishing system 7. Consequently, a passing motorist who observes the billboard and becomes interested in the restaurant can simply send an MMS message from his cellular telephone to the advertised telephone number of the restaurant. In response, the motorist will receive at his cellular telephone the previously published content, which may include, for example, the restaurant's hours, menu, directions, or other useful information designed to entice the motorist into visiting the restaurant.

As yet another example, a young person may publish a party invitation to his friends on the MMS publishing system 7. Accordingly, anyone who knows his cellular telephone number can view the invitation on his cellular telephone by sending a "*" message to that telephone number. Of course, many other possible use scenarios can be envisioned.

Keywords to Identify Content

As noted above, a publishing user (or "publisher") can also associate keywords with content during the authoring/publishing process. In this way, a publisher can specifically identify and publish multiple independent items of content. In this scenario, as in the above scenarios, the presence of the "*" character in an MMS message indicates that the message is a request for content, rather than a person-to-person message. Further, any characters appended to the "*" character in the MMS message are interpreted as a keyword that specifically identifies the requested content. So for example, Ralph may publish a home page (e.g., his business card) that will be sent to a requester in response to any MMS message sent to Ralph's telephone number that includes only the "*" character. However, Ralph may also publish a second item of content, associated with a keyword. In that case, the second item of content will only be sent to a requester in response to an MMS message sent to Ralph's telephone number that includes the keyword appended to the "*" character.

As a more specific example, Ralph may publish his business card as his home page, by not associating it with any keyword. Ralph may also publish, for example, the game schedule of the high school football team that he coaches, by associating the keyword "football" with the game schedule. Ralph also may publish a photo of his most recent vacation by associating the keyword "vacation" with the photo. Accordingly, Ralph's business card will be returned in response to any MMS message that includes only the "*" character, sent to his telephone number. The game schedule will be returned in response to any MMS message that includes "*football" sent to Ralph's telephone number; and, the vacation photo will be returned in response to any MMS message that includes "*vacation" sent to Ralph's telephone number.

Photo Albums

With the functionality described above, the MMS publishing system 7 also provides an easy way for users to publish albums of digital photographs to other users and to view photo albums of other users. A first user, User 1, by using a cellular telephone with a built-in camera, can take a photo with that device and send it by message to the MMS publishing system 7 with a special keyword, such as "*save". This "*" message causes the photo to be stored in the User 1's default photo album in the MMS publishing system 7. At a later time, a second user, User 2, can send a "*" message as a browse command to the telephone number of the User 1, to retrieve and view the photo from the User 1's network storage.

The "*save" command (or other similar command) can also be used by User 1 to upload multiple photos to a photo album. In that event, in response to User 2 submitting the browse command "*", the MMS publishing system 7 may simply return a predetermined number of the stored photos, i.e. the first n photos in User 1's album, in the MMS response. The MMS response also indicates how User 2 can view the remaining photos. For example, assume the MMS response to User 2 initially includes photos 1 and 2 of six photos stored in User 1's album. The response may then include text such as, "Photos 1-2 of 6", and, after displaying photo 2, the prompt, "Send '*3' to view next photo".

User 1 may create multiple photo albums in the MMS publishing system 7, where each photo album can be identified by a different keyword or keyword suffix (e.g., "*save Hawaii2002", "*save Europe2003"). In addition, each photo may be associated with an identifier (e.g., "Tommy", "Jane"). In case that User 2's "*" message includes specific photo identifier(s), only the photo for which there is an identifier in the "*" message is sent to User 2. Otherwise, all photos associated with User 1 may be sent to User 2 in response to User 2's "*" message.

Publishing Voice Content

In certain embodiments of the invention, a special MMS telephone number can be set up to allow users to publish voice content or other audio content through the MMS publishing system 7, via telephone. In such embodiments, a user simply calls a special telephone number associated with the MMS publishing system 7 from his cellular or wireline telephone and records voice fragments by following a series of prompts and/or voice menu selections. The voice fragments are associated with the user's own telephone number and a preconfigured keyword during the call (e.g., by using voice commands or DTMF tones) and are thereby stored as that user's content on the MMS publishing system 7. The voice fragments can then be retrieved by a requesting user via MMS.

Access to Internet-Hosted Content

Figure 7:
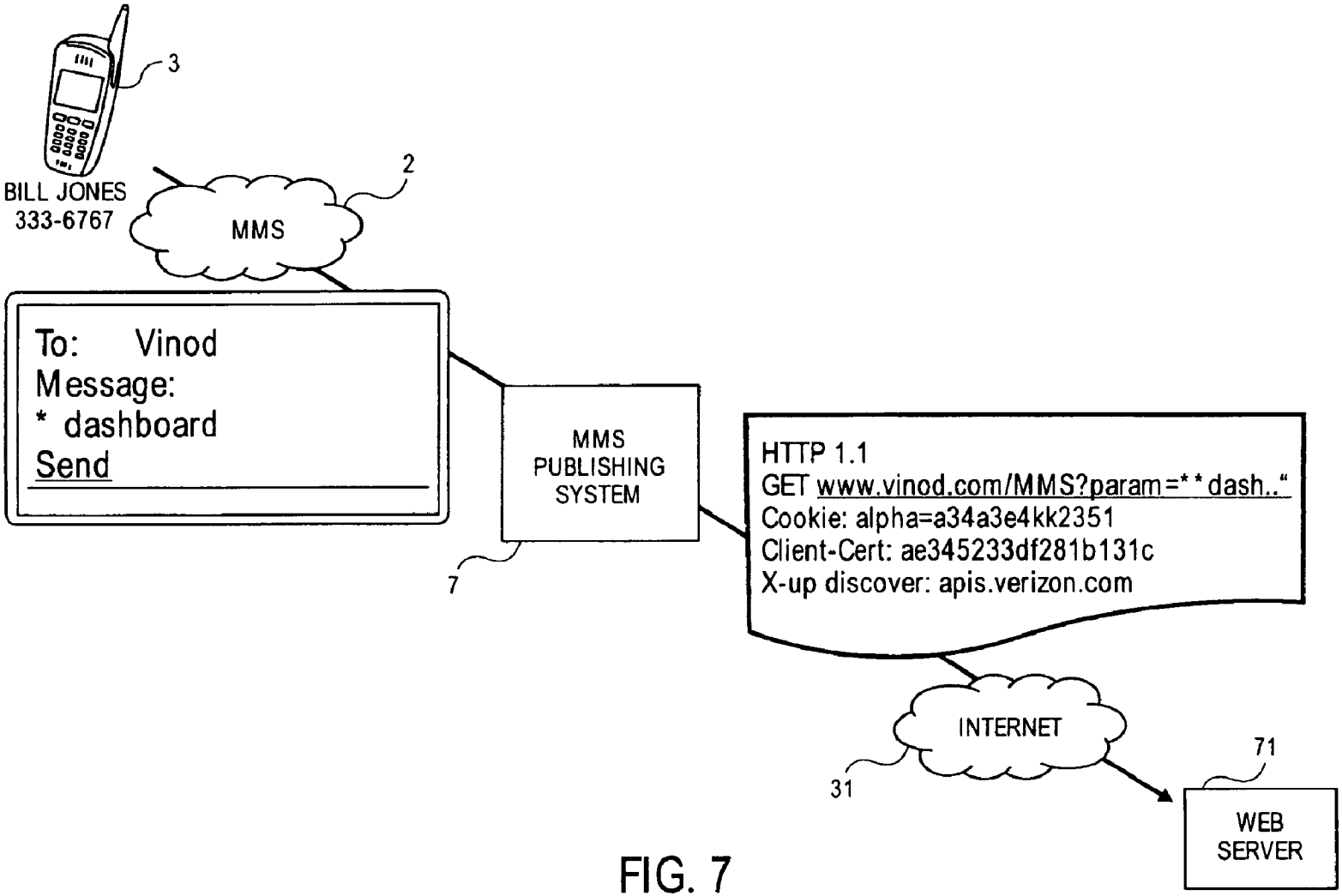
FIG. 7 shows how the MMS publishing system can be used to access content hosted remotely on the Internet or other network.

Published content does not have to be stored locally in the MMS publishing system 7. The MMS publishing system 7 may also be used to access published content that is hosted remotely on the Internet or some other network. FIG. 7 illustrates how this may be accomplished. In the illustrated embodiment, the MMS publishing system 7 is connected (either directly or indirectly) to the Internet 31. The MMS publishing system 7 receives an MMS "*" message with a keyword ("dashboard" in the illustrated example) directed to the telephone number of a particular user, for requesting the content. The MMS publishing system 7 maps the destination telephone number to a target URL associated with a Web server 71 on the Internet 31. The MMS publishing system 7 responds to the request by sending, for example, a standard HTTP 1.1 GET request over the Internet 31 to the Web server 71. The keyword is passed to the Web server 71 as a parameter of the target URL in the GET request, as shown. The request may be "stateful", such that it may include one or more cookies used by the target application on the Web server 71. In addition, the request may include a client certificate, which can be used in conjunction with a secure protocol, such as secure HTTP (HTTPS), effectively to authenticate the carrier. The MMS publishing system 7 may also provide access control and authentication services, as described further below.

Managing Session State

Typical messaging-oriented applications are stateless from message to message. In contrast, Web based (e.g. HTTP based) applications typically manage state via a client side cookie cache. The MMS publishing system 7 described herein can be used to manage session state for purposes of accessing content and applications. For example, the MMS publishing system 7 can be used to store and manage cookies from applications, on behalf of clients 3, as shown in FIG. 7.

Business Model

Figure 8:
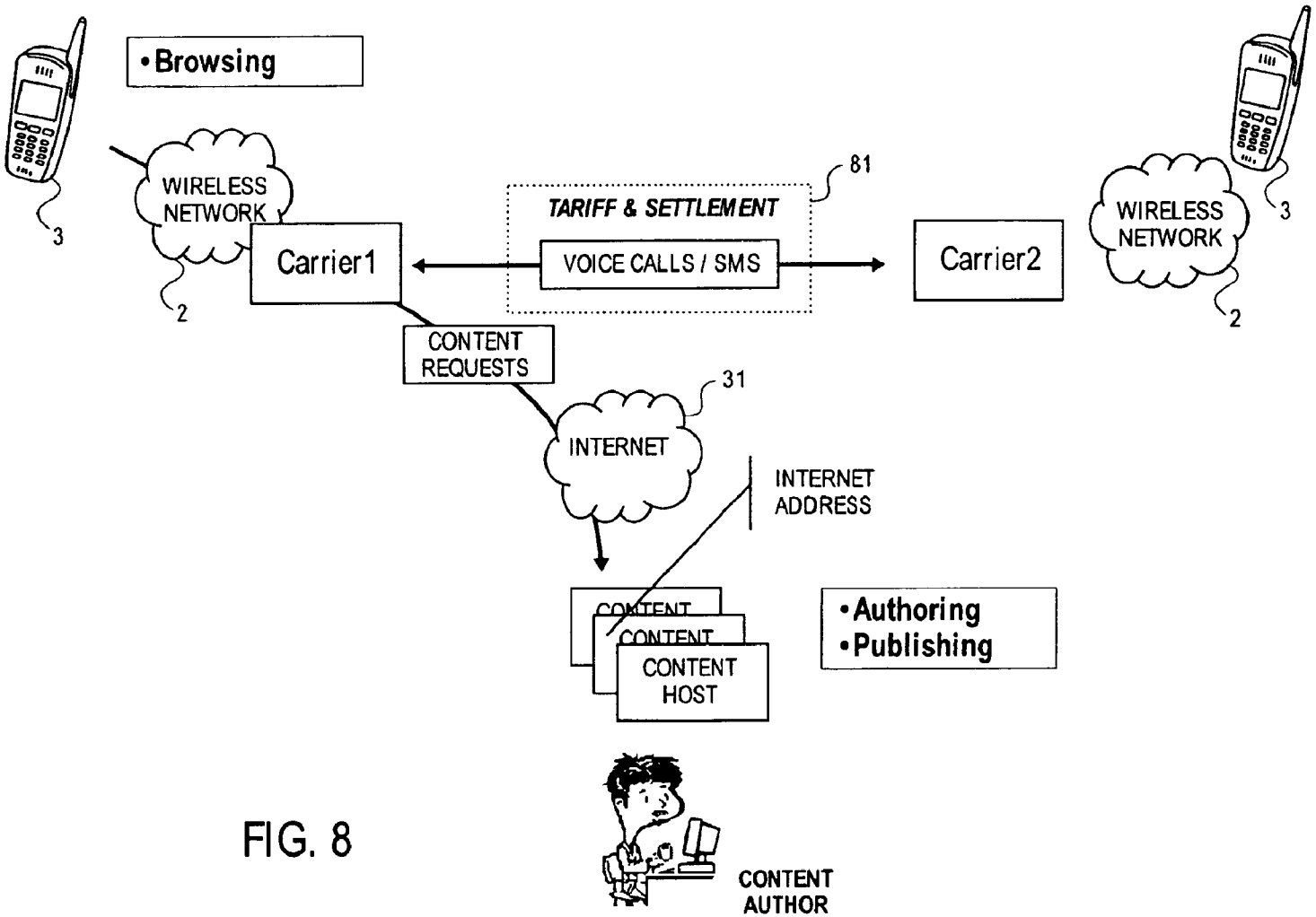
FIG. 8 illustrates the business model for conventional WAP-based publishing of content to mobile devices.

The above described solution is advantageous to wireless carriers from a business standpoint, because they can use it to generate revenue using existing SMS/MMS-based billing methods and infrastructure. This business aspect is discussed further now with reference to FIGS. 8 and 9. FIG. 8 illustrates the business model for conventional WAP-based publishing of content to mobile devices. The WAP business model is essentially a carrier-to-Internet model. The wireless carrier provides a low-cost, high quality of service (QOS) Internet "on-ramp". Content is unbundled from the network, so that the inter-carrier tariff and settlement structure 81 for voice calls, SMS/MMS, etc. is completely bypassed for purposes of content publishing. Most value in content requests is serviced on a public, cost-free network, i.e., the Internet 31. Further, content is more easily reachable from non-carrier-bound clients, such as desktop PCs. Internet based entities (as opposed to wireless carriers) determine content availability. Furthermore, the business model is at risk from disruptive on-ramp technology, such as WiFi.

Figure 9:
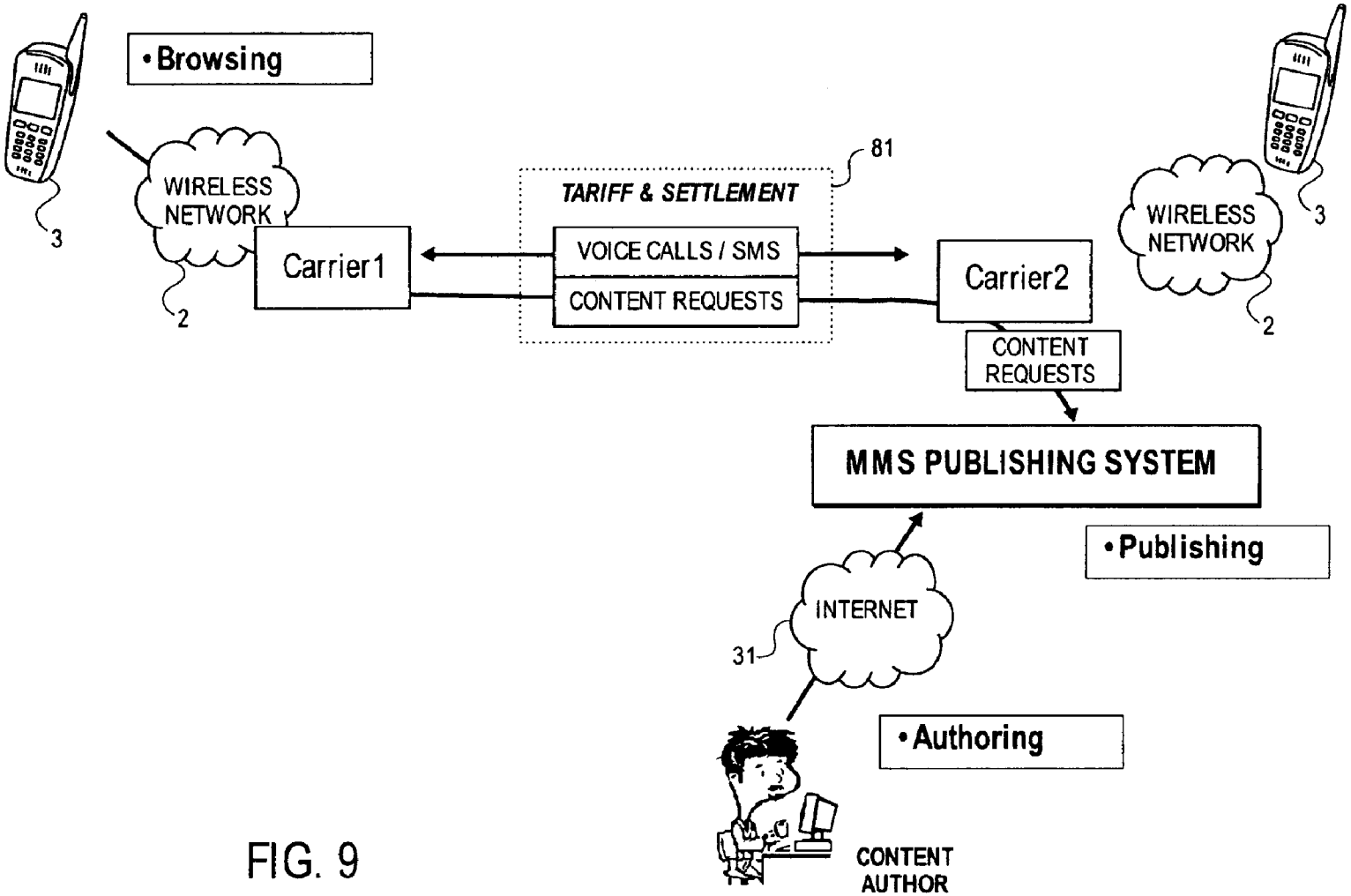
FIG. 9 illustrates the business model for content publishing using the MMS publishing system.

In contrast, FIG. 9 illustrates an example of a business model for content publishing, according to the MMS-based messaging solution introduced herein. In this model, the clients and the content are integrated into the cross-carrier network. Content is explicitly authored to conform to mobile device form factors, and the carriers subsidize content publishing and content availability. The carriers' namespaces (i.e., telephone numbers) are used to index content. The inter-carrier SMS/MMS request tariff provides for cross-carrier settlement of tarrifs for content requests. Further, this business model is robust against changing on-ramp technology, such as WiFi.

Application Services

The MMS messaging based solution introduced herein can be employed beyond just for publishing and accessing content, to allow mobile users to access other types of application services. When using this solution to access application services, an end-user telephone number (the destination telephone number) can effectively be an application address. An example of such application services is location services, which provide a mobile user with his current location, the current location of another mobile user, and/or the location of some other entity. Other examples of application services that can be accessed include obtaining stock quotes; obtaining current weather conditions; an electronic invitation (evite)-like application that manages an RSVP list of telephone numbers; or, corporate publishing where an employee is able to have his calendar published to a keyword for retrieval via MMS; etc. Such applications may be hosted by the user's wireless carrier, remotely on the Internet, or on some other network.

So for example, through use of the MMS publishing system 7, a mobile user might access location services to locate his friend, another mobile user, by sending a message including "*find" to his friend's mobile telephone number. Similarly, he might obtain a map of his own area by sending a "*find" message to his own mobile telephone number. Or, he might obtain a map to a particular business entity by sending the same type of message to a mobile telephone number assigned to the business. Further, the user might obtain a map showing the closest instance of a particular type of business, identified by a keyword, by sending a "*" message of the format "*Find[keyword] to his mobile directory assistance telephone number (e.g., 411). Hence, by using the solution described herein, an end-user telephone number (the destination telephone number) can effectively be an application address.

Security for Application Services

The solution introduced herein inherently also provides strong protection against fraudulent or unauthorized use. Current mobile data application services based on WAP use Web-style authentication mechanisms, in which an end-user is given an ID originating from a given Web server/service. That approach has several weaknesses. First, it involves weak, nontransferable client-side authentication (a client ID is not very easy to use across multiple sites). Second, little or no infrastructure exists to allow federated assignment or revocation of transferable user IDs across multiple sites. Third, the server-side authentication is very weak. The primary proof one has that one is talking to a given server is the domain name service (DNS) address visible in the browser address bar and/or the certificate mapping to the DNS name. Fourth, the "quality" across the network for ID issuance is extremely variable. It is extremely difficult to programmatically safeguard against the difference in ID issuance security for to users with the same username and different domains, e.g., bilig@yahoo.com versus billg@msn.com. Fifth, significant processing resources must be devoted to evaluating credentials within a given application. Significant code within each application must be written to respond to authentication scenarios (e.g., password issuance, recovery, bad passwords, denial of service attacks on password forms).

In contrast, with the solution described herein, the identity of a requester, publisher or hosted application is always tied to a valid telephone number of an end user. There is a large body of existing convention regarding the "quality" of a telephone number as an ID, its strengths, and its spoof-proofing. It is practically impossible to impersonate someone else's telephone number and to receive telephone calls intended for that person. Wireless carriers already know how to federate and manage the ID space between them, and they adhere to conventions for managing risk relating to issuance of telephone numbers.

When a consumer buys a cellular telephone or cellular telephone service plan, he is assigned a valid telephone number for use with a particular cellular telephone. Normally, as part of the process of signing up for the service plan, the consumer must provide his name and address in writing along with proof of identity and must be approved through a credit check process. Only then is the consumer assigned a telephone number and the service plan activated. The consumer thus becomes registered with the wireless carrier in association with the assigned telephone number and a particular cellular telephone.

Thus, with the solution described herein, both the client and the server are a priori authenticated in a very strong manner before an application is ever invoked. Consequently, telephone numbers (both the source and destination numbers) act as a strong authentication handle with the solution described herein. When a consumer sends a "*" message from his MMS client, his telephone number is normally added to the message as a header by his carrier's MMSC and can be read by a receiving device. Likewise, a telephone number used to publish content or to host an application inherently provides the wireless carrier (and, therefore, the requester) with a high degree of confidence that the publisher or application host is who he/it purports to be.

If a remote application has its own authentication database, it can set up a relatively secure identity mapping between a telephone number and its own authorization database. For example, if Bank of America has a customer with the userID, "Fred", and it knows that Fred has a certain telephone number, then Bank of America can now trust telephone number assertions for a given wireless carrier.

Thus, using this solution, access control lists (ACLs) can be set up and maintained within the MMS publishing system 7, to control access to published content and/or applications.

The ACLs can be such that the MMS publishing system 7 can be used to control access to applications (which may be hosted locally, on the Internet, or elsewhere), without revealing client identities to those applications.

This approach is in contrast with standard Web applications, where the ACL is normally managed within the application being invoked, and the client must provide some type of credentials to the application for evaluation. The standard Web technique, therefore, has the disadvantage that even if the credentials are not recognized by the called application, they can be appropriated by the application and can be used to violate the user's privacy.

Figure 10:
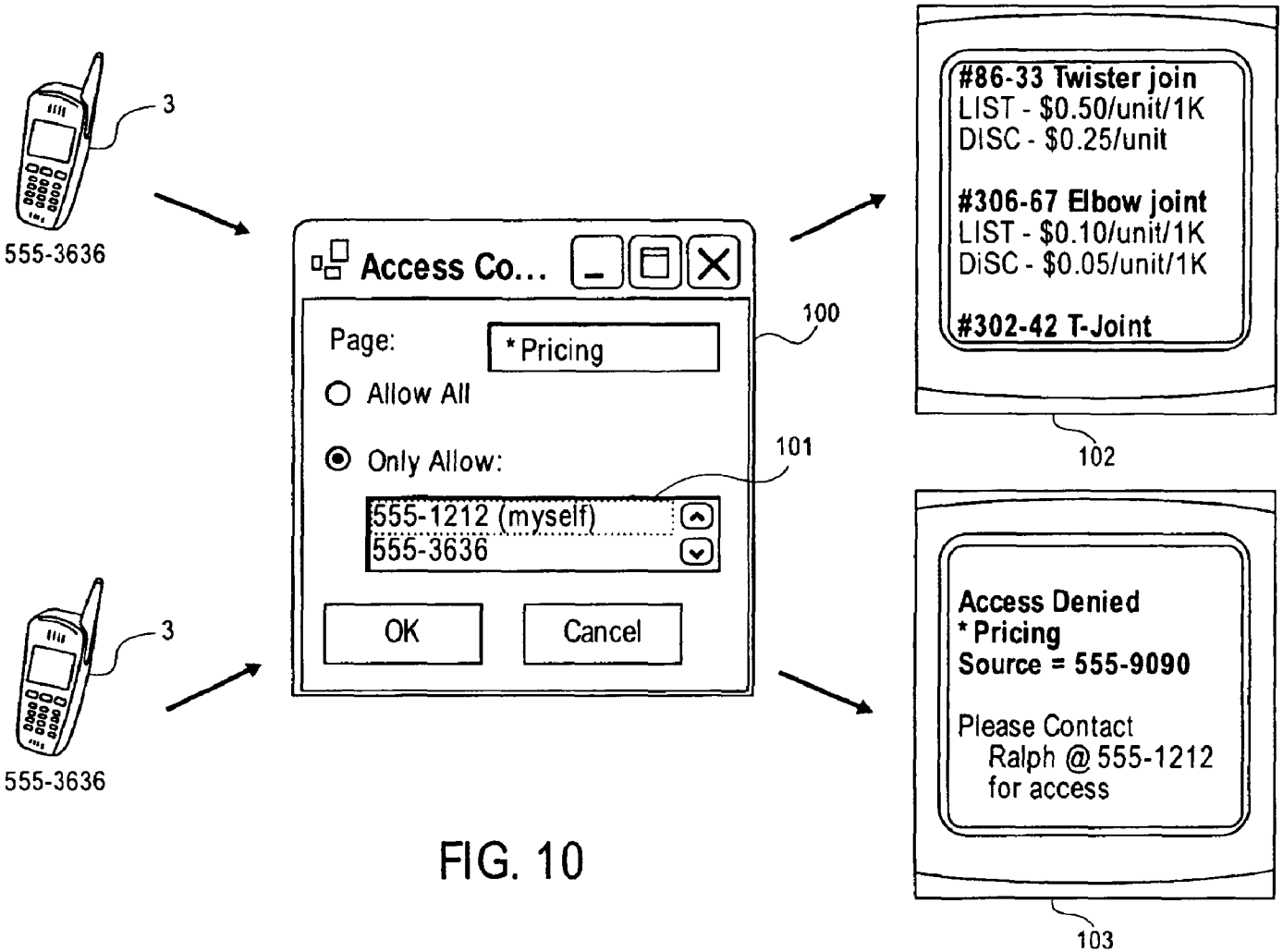
FIG. 10 illustrates an example of how the MMS publishing system can provide authentication services using access control lists (ACLs)

FIG. 10 illustrates an example of how the MMS publishing system 7 can be used to provide strong authentication, without leaking client identities to downstream applications. A publisher sets up an ACL 101 in the MMS publishing system 7 through a graphical user interface 100 when authoring, publishing or editing content. In the illustrated example, the publisher is the owner of a retail business, and the content is an inventory price list associated with the keyword "Pricing". The business owner desires to make the price list available to certain sales personnel working in the field via their cellular telephones. The ACL 101 in this example specifies the wireless telephone numbers of the users who are authorized to access the price list. When a message containing "*Pricing" addressed to the owner's telephone number (555-1212 in this example) is received by the MMS publishing system 7, the MMS publishing system 7 determines whether the telephone number of the device which sent the "*" message (i.e., the "source" telephone number) is in the ACL 101. If the source telephone number is in the ACL 101 as an allowed source telephone number, the price list is returned to the requesting user as shown in screen display 102. If the source telephone number is not in the ACL 101, then a message indicating that access is denied is sent to the requesting user, as shown in screen display 103.

Figure 11:
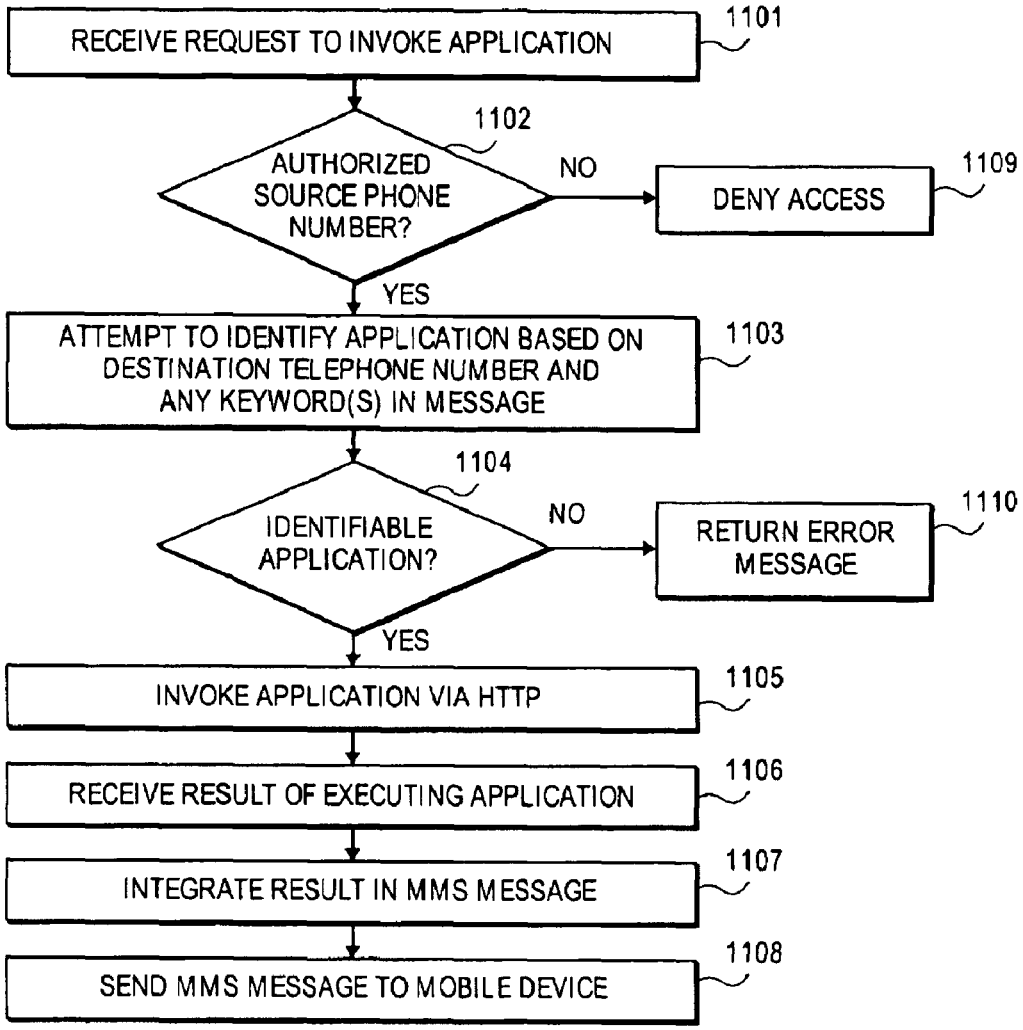
FIG. 11 is a flowchart showing a process by which the MMS publishing system can securely provide access to an application in response to a request from a mobile device.

FIG. 11 shows an example of a process by which the MMS publishing system 7 can securely provide access to an application in response to a request from a mobile device 3. At block 1101, the MMS publishing system 7 receives, from a mobile device 3, a request to invoke an application (e.g., location services), in the form of a "*" message. The MMS publishing system 7 then determines at block 1102 whether the source telephone number is an authorized number, using an ACL, for example. If the source telephone number is not authorized, the MMS publishing system 7 denies access to the application at block 1109. If the source telephone number is authorized, then at block 1103 the MMS publishing system 7 attempts to identify the application based on the destination telephone number and any keyword(s) in the request. If the application is not identifiable, determined at block 1104, the MMS publishing system 7 returns an error message to the requester at block 1110. If the application is identifiable, then at block 1105 the MMS publishing system 7 invokes the application, via HTTP for example. The MMS publishing system 7 subsequently receives the result of executing application at block 1106, integrates the result into an MMS message at block 1107, and sends the MMS message containing the result to the requesting mobile device 3 at block 1108.

Messaging Hyperlinks

Figure 12:
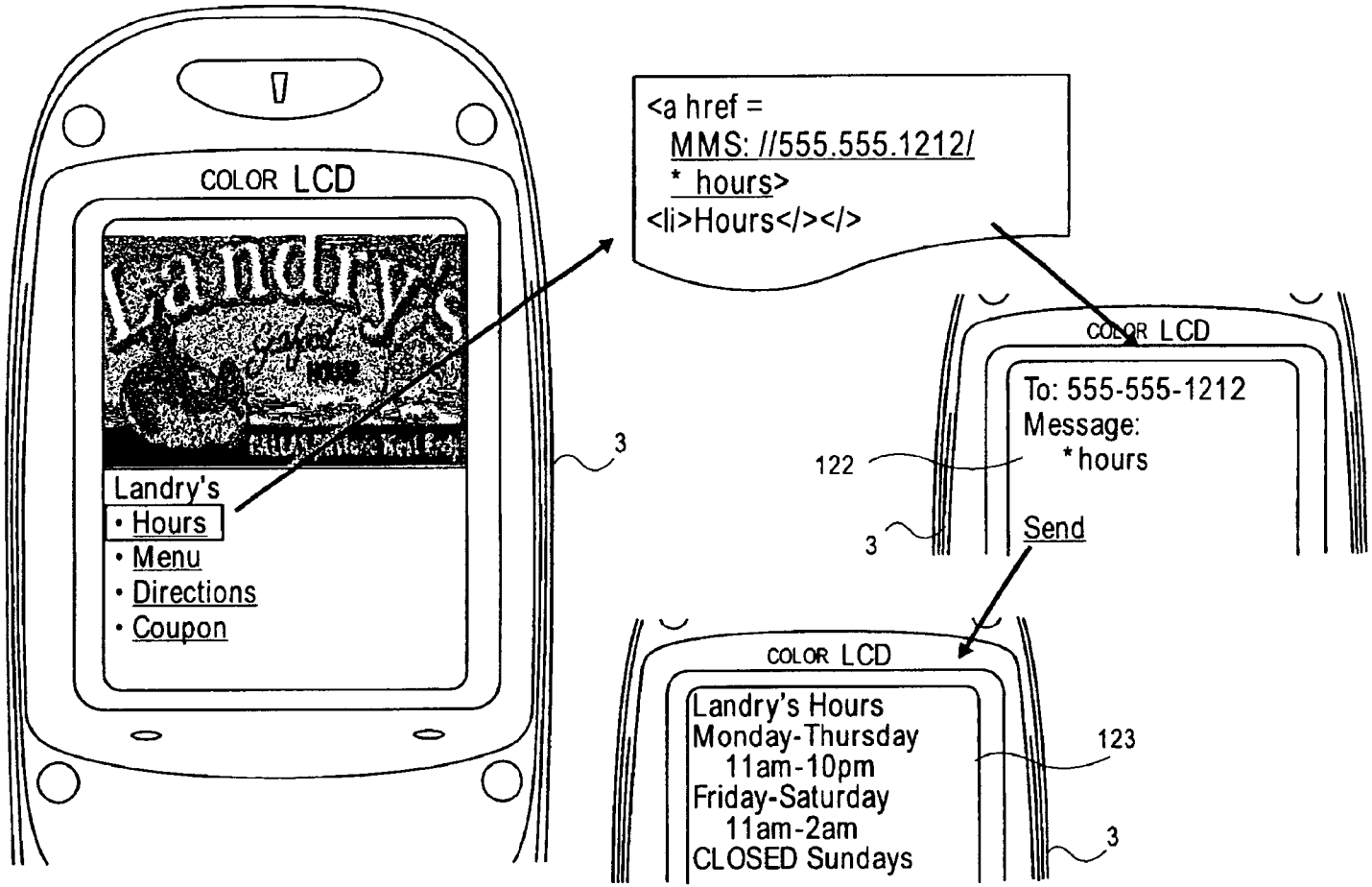
FIG. 12 illustrates the use of messaging hyperlinks in an MMS message.

It may be desirable to incorporate hyperlinks into content accessed using the MMS messaging based techniques described above. So for example, if a user requests and receives the home page of a favorite restaurant via MMS, that home page can include hyperlinks to a separate menu page, a directions page, a business hours page, etc. FIG. 12 shows an example illustrating how this may be accomplished.

Initially a user of a mobile device 3 requests and receives an MMS page 121, which in this example is the home page 121 of a restaurant. The home page lists several hyperlinks to other pages. Rather than standard HTTP links, however, the links are MMS-type links which each include one or more keywords identifying the target of the link. For example, to access the business hours page, the link may have the following format, where the keyword is "hours" and 555.555.1212 is the restaurant's MMS telephone number:

```
<a href = MMS://555.555.1212/*hours> <li>
    hours</> </>
```

Assume, therefore, that the user then scrolls down and selects the "Hours" link Invoking the link causes a preaddressed and precomposed "*" message 122 to be generated, which the user can send in the standard MMS way. Note that visibility of this page aids discoverability of the keyword namespace. The consumer knows that a new message results in a new charge. The consumer subsequently receives the response message 123, from the MMS publishing system 7, containing the restaurant's business hours.

Messaging Forms

Figure 13:
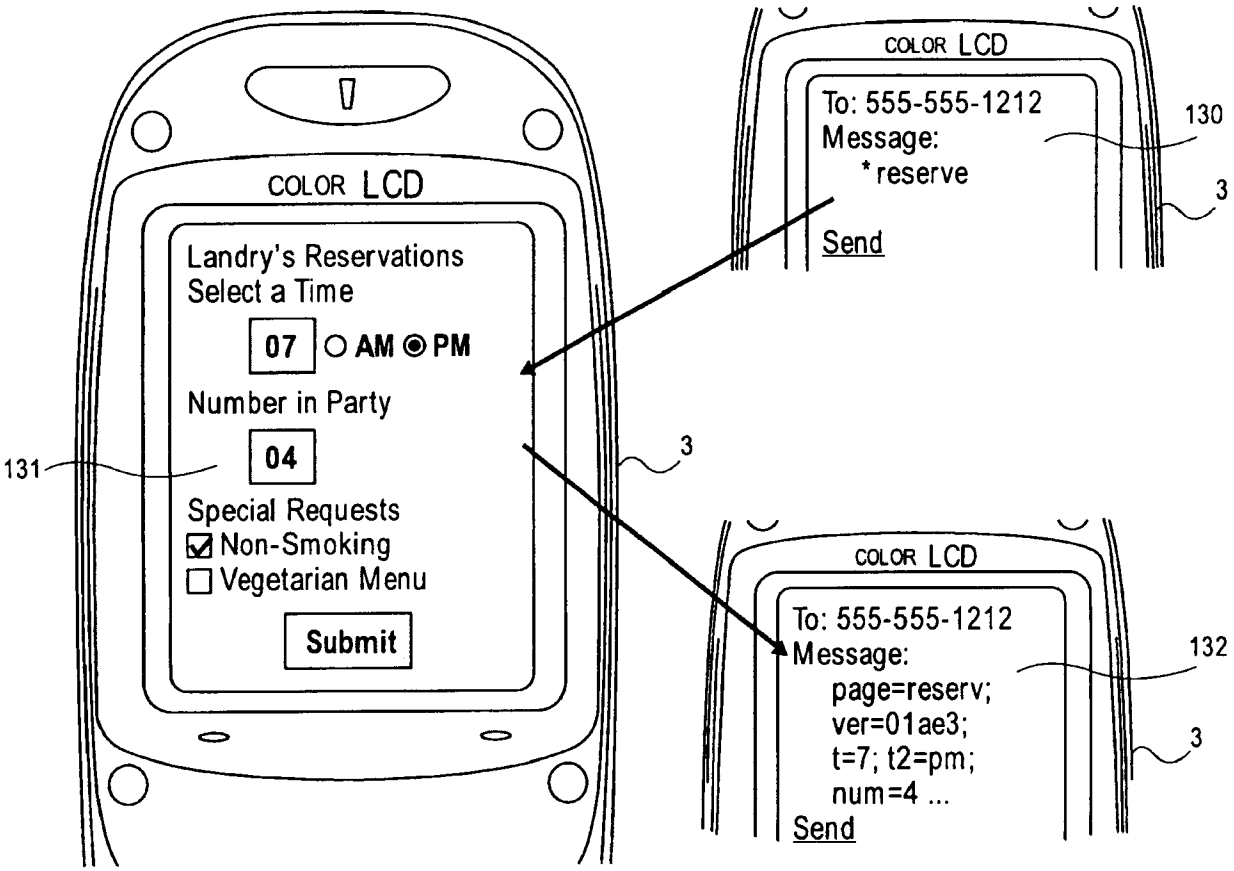
FIG. 13 illustrates the use of forms in an MMS message.

It may also be desirable to use forms in conjunction with the MMS based messaging techniques described above. Accordingly, a mechanism is needed for naming a form and its corresponding form handler in the MMS publishing system 7. A keyword can be used for this purpose, which may be in the format, "*Form [keyword]". This approach is illustrated in FIG. 13. Note that in conventional HTML, a URL would normally be used to name a form.

An approach similar to that used for MMS hyperlinks can be used. Referring to FIG. 13, assume that a user using a mobile device 3 initially requests and receives a restaurant's "reservations" form 131, by sending a "*" message 130 with a keyword, such as "reserve". The MMS client in the mobile device 3 allows the user to fill the form in within the context of the user's MMS Inbox. The user can keep this form 131 in his Inbox to create a reservation sometime in future, and he can forward the form 131 via MMS to friends for their use. It can be seen, therefore, that an instance of an MMS-based form can have a much longer lifespan in the network than its responding form handier (e.g., an old version of the form may be forwarded amongst people, stored in inboxes, etc.). Consequently, a mechanism to handle versioning should be provided, as described below.

After entering data into the form 131, the user submits the form 131 back to the MMS publishing system 7 as an MMS message 132. In the submitted message 132, the data entered into the form are specified as simple key-value pairs. The submitted message 132 also includes a page identifier ("reserv" in this example) to match the data to a form handler, and a page version identifier ("01ae3" in this example) to match the version of the form in the mobile device with the form handler.

As an extension of this approach, messaging forms can also be used in e-mail by using a similar header.

Client-Side Address Book Features

Figure 14:
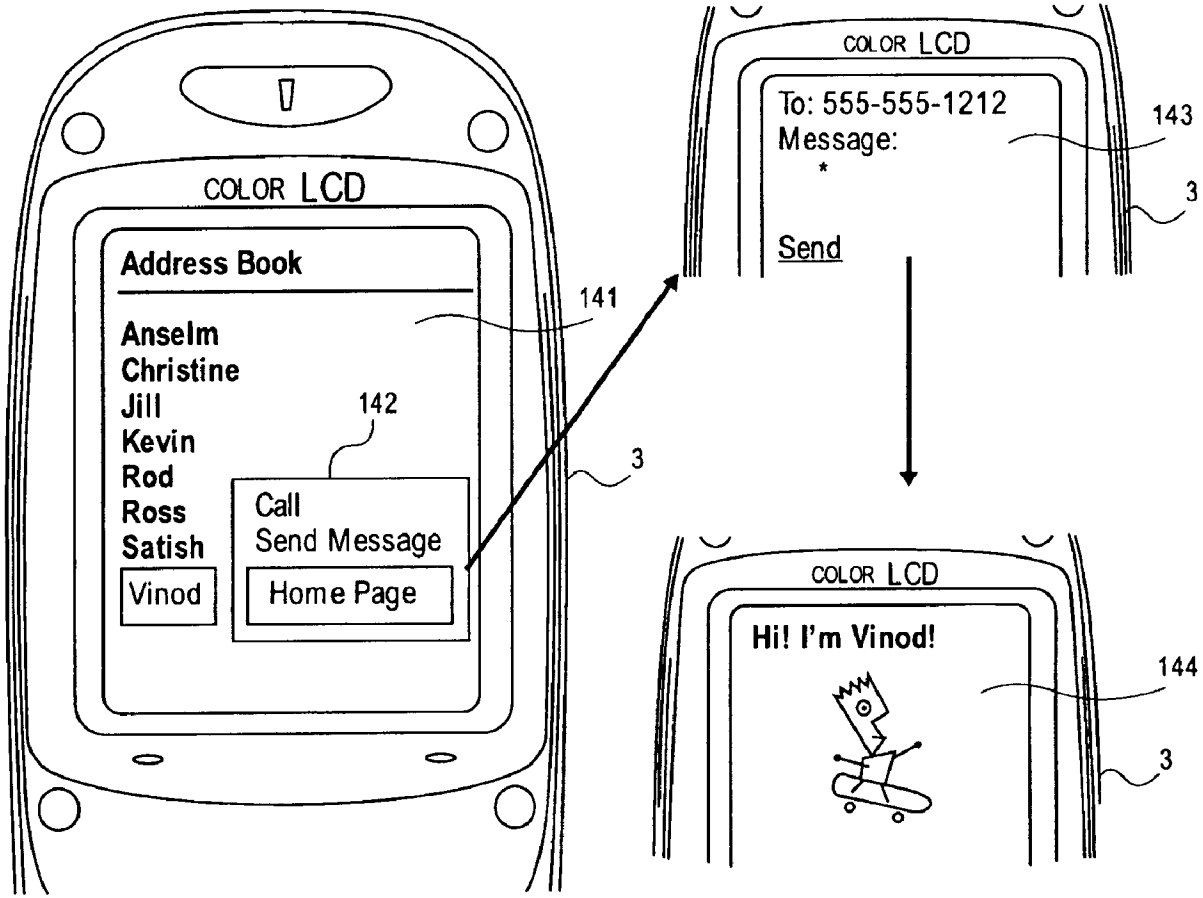
FIG. 14 shows how an MMS request for content can be initiated from an address book in a mobile device.

The MMS client software in a cellular telephone or other mobile device can be configured to enhance the user's experience when using the system. For example, the client software in such mobile devices generally includes an address book from which the user can initiate a call. Accordingly, to allow easier navigation to published content, an option can be provided within the address book of the mobile device, to allow a user to directly request a published page from the address book. So, as shown in the example of FIG. 14, while viewing the address book 141 the requesting user can simply highlight the name of a contact who has published content, which causes one or more menu items 142 to appear, e.g., "Call", "Send Message", and "Home Page". The user's selecting the "Home Page" option automatically causes a "*" message 143 to be generated, addressed to the telephone number of the addressee, which can be sent by the user to request the published content 144.

Figure 15:
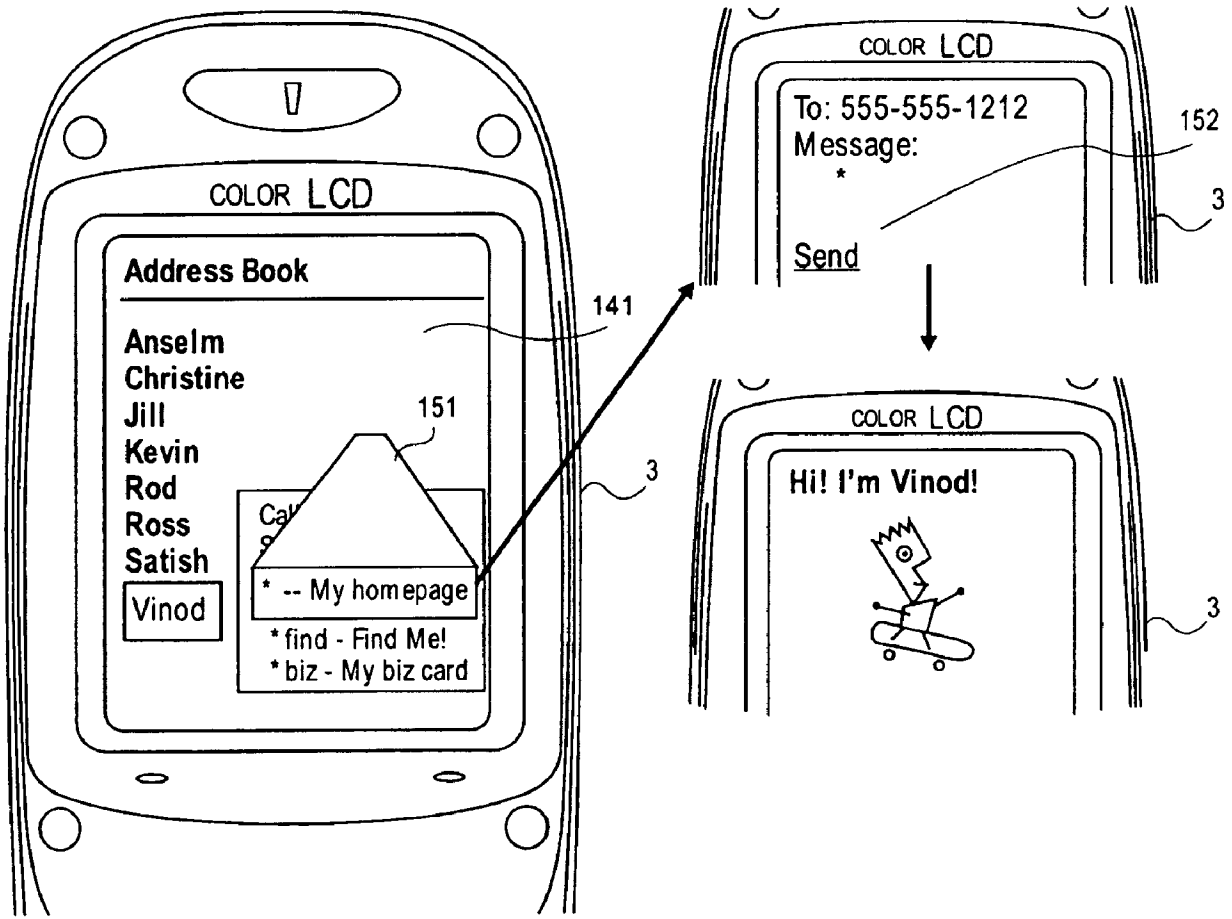
FIG. 15 shows how a list of discovered published content, in an address book in a mobile device, can be used to initiate a request for content.

As shown in FIG. 15, the address book 141 in a mobile device 3 may also provide the user with direct access to published pages that have been previously "discovered", either automatically or by the user. In a similar manner to that shown in FIG. 14, a list 151 of discovered pages may be associated with each entry in the address book 141. Selecting one of the entries in the address book 141 causes a list 151 of any discovered pages associated with that entry to be displayed. Selecting one of the discovered pages from the list 151 then automatically causes a request 152 for that page ("*" message) to be generated, where the destination telephone number and any keyword(s) are automatically inserted by the MMS client. The discovered pages may include published pages that have been automatically discovered by the mobile device and/or by the MMS publishing system. The discovered pages may also include pages from a "recently-requested" cache (e.g., the MMS client simply remembers the last n pages requested), and/or they may have been explicitly saved by the user as "favorites" or "bookmarks".

Web Services

Web Services Hosted at an End User Telephone Number

The MMS based messaging solution introduced herein can also be used to host Web services at the telephone number of an end-user. The term "Web services" describes a standardized way of allowing different applications operated by different entities to communicate with each other in a distributed environment, typically over the Internet. Web services involves one application invoking another, rather than an end user invoking an application. Through Web services, applications can share business logic, data and processes through a programmatic interface across a network.

To access Web services using the MMS based solution, a calling application simply "logs in" as a "consumer" into the MMSC of the originating carrier and submits a "*" message via MM7 (MMS). Some authentication mechanism may be provided to authenticate the calling application. A Web services request may be distinguished from other types of "*" messages by, for example, including a particular keyword in the message, such as "*API GetLocation". Using this approach, MMS is essentially used as a "tunnel" for application program interface (API) invocations. The body of the "*" message includes the actual parameters of the API call. An example of such a "*" message is as follows, where 555-1212 is the destination telephone number, and the application being called is a location application:

```
<to>555-1212</to>
<body>
*API GetLocation
</body>
```

The source telephone number is then added to the "*" message by the originating MMSC, such that the "*" message in the above example has the form, where 333-6767 is the source telephone number:

```
<to>555-1212</to>
<from>333-6767</from>
<body>
*API GetLocation
</body>
```

Hence, strong, carrier-guaranteed, dual-party authentication is inherent in this approach.

The MMS publishing system 7 at the terminating carrier may include a mechanism for a person to publish his own Web services APIs that can take advantage of the above-described capabilities.

Consider the following example, in which a credit card issuer (e.g., a bank) uses Web services along with the solution described herein, to determine whether to authorize charges requested against one of its issued credit cards. When a credit card purchase is attempted at a merchant location, the card issuer may wish to determine if the purchase is actually being attempted by consumer to whom the card is issued (the legitimate cardholder), before approving the charges. If the legitimate cardholder is not located at the location of the merchant when the charges are requested, this could indicate a fraudulent attempt to use the credit card, triggering a higher level of scrutiny.

Hence, when charges are requested on the credit card, an authorization/verification application operated by the card issuer automatically sends a "*" message to the mobile telephone number of the legitimate cardholder, which is stored in a database of the card issuer. The "*" message represents an application programming interface (API) call to a remote location application. The MMS publishing system 7 detects this API call and invokes the location application on behalf of the calling application. The location application returns the current location of the mobile device of the cardholder, which the MMS publishing system 7 returns to the calling application in an MMS message. Based on the indicated location, the calling application (operated by the card issuer) determines whether the legitimate cardholder is located at the merchant location.

Note that a conventional, consumer-centric Web service invocation (i.e., without using the solution described herein) requires identification/addressing and security for three different parties: 1) the Web service requestor (e.g., the credit card issuer in the above example); 2) the service access point (e.g., api.sprint.com); and 3) the end user in relation to whom the Web service is being requested (e.g., the cardholder). It can be seen, therefore, that the end user's phone number to which a Web services "*" message is addressed implicitly specifies a particular service access point. Consequently, addressing requirements for a single Web service invocation are simplified using the solution described above, compared to conventional consumer-centric Web services.

Inter-Carrier Messaging to Reconcile Chargebacks for Web Services

The inter-carrier messaging infrastructure for SMS/MMS can also be used to reconcile chargebacks for Web services. Current Web services models for mobile networks do not have a specified billing model for service invocations. In addition, there is no model in place that allows for revenue sharing between the network supporting the Web service invoker and the network supporting the called Web service. In contrast, the solution described herein layers Web service API invocations on MMS messages dispatched between carriers, to trigger billing events and cross-carrier settlement.

Inter-Carrier Messaging to Provide Cross-Carrier Web Services Connectivity

The inter-carrier SMS/MMS infrastructure also allows Web services connectivity between different wireless carriers. Current Web services models for wireless networks require a specific binding to a service access point for a given user at a given carrier. That approach has the problem of being extremely unwieldy, from a business and technical perspective, for allowing rendezvous between a Web service provider and a user. For example, in the conventional model, in order for an application provider to invoke an API against a user hosted at Carrier A, that application provider must have some binding directly to Carrier A. If another user is hosted at Carrier B, a new binding to Carrier B must also be created. Consequently, the network never achieves "critical mass", i.e., the network never achieves cross-connections between users and Web service providers sufficient to stimulate a significant market.

In contrast, the solution described herein uses MMS inter-carrier transport and telephone number addressing to provide content providers with a single service access point, which can reach any user hosted at any member carrier. As a result, a Web service requester bound to one carrier can use the MMS inter-carrier network to invoke services for a user hosted on a different network.

Processing System Architecture

It will be apparent from the preceding discussion that the techniques introduced above can be implemented in software, which can be executed in processing systems that have conventional hardware. Hence, each of the processing systems described above (the mobile devices 3, the MMS publishing system 7, etc.) can be conventional in terms of its hardware. Alternatively, the techniques described above can be implemented in circuitry specially designed for such purposes, or in a combination of specially-designed circuitry with software executed by conventional hardware.

Figure 16:
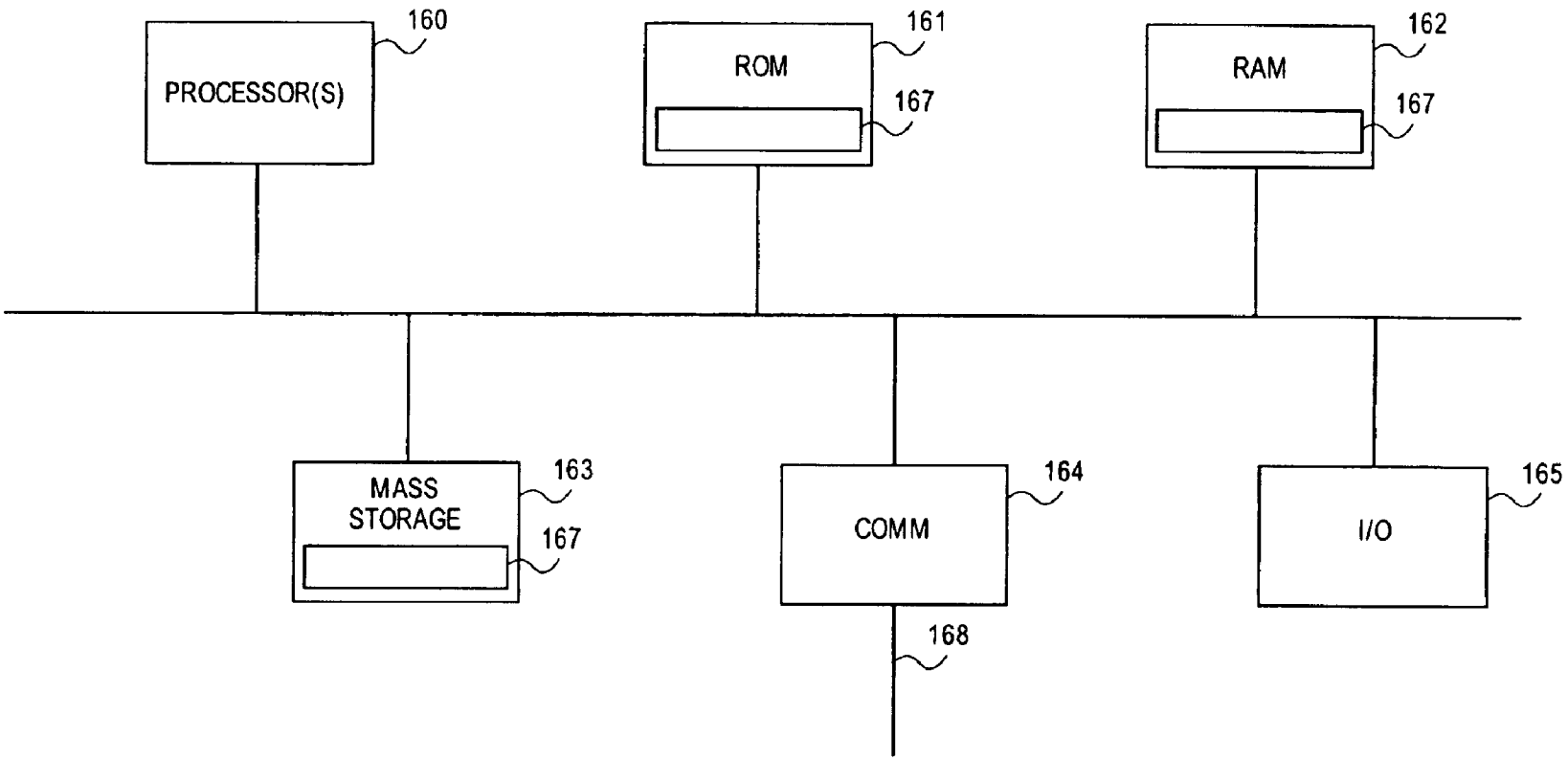
FIG. 16 is a high-level, architectural block diagram of a processing system representative of any of the processing systems described herein.

FIG. 16 is a high-level block diagram of a processing system representative of any of the processing systems mentioned above, in which aspects of the present invention can be implemented. Note that FIG. 16 is a conceptual representation which represents any of numerous possible specific physical arrangements of hardware components; however, the details of such arrangements are not germane to the present invention and are well within the knowledge of those skilled in the art. Also note that, in certain embodiments, some of the above-mentioned processing systems may be distributed between two or more separate hardware platforms.

The processing system shown in FIG. 16 includes one or more processors 160, i.e. a central processing unit (CPU), read-only memory (ROM) 161, and random access memory (RAM) 162, each connected to a bus system 166. Also coupled to the bus system 166 are a mass storage device 163, a data communication device 164, and in some embodiments, one or more additional input/output (I/O) devices 165.

The processor(s) 160 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus system 166 includes one or more buses or other physical connections, which may be connected to each other through various bridges, bus controllers and/or adapters such as are well-known in the art. For example, the bus system 166 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire"). In alternative embodiments, some or all of the aforementioned components may be connected to each other directly, rather than through a bus system.

The mass storage device 163 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

The data communication device 164 is a device suitable for enabling the processing system to communicate data with a remote processing system over a data communication link 168, and may be, for example, a conventional telephone modem, a wireless modem, an Integrated Services Digital Network (ISDN) adapter, a Digital Subscriber Line (DSL) modem, a cable modem, a radio transceiver, a satellite transceiver, an Ethernet adapter, or the like.

The I/O devices 165 may include, for example, one or more devices such as: a pointing device such as a mouse, trackball, touchpad, or the like; a keyboard; audio speakers; and/or a display device such as a cathode ray tube (CRT), a liquid crystal display (LCD), or the like. However, such I/O devices may be omitted in a system that operates exclusively as a server and provides no direct user interface. Other variations upon the illustrated set of components can be implemented in a manner consistent with the invention.

Software (including instructions and data) 167 to implement the techniques described above may be stored in one or more of ROM 161, RAM 162, and mass storage device 163. In certain embodiments, the software 97 may be initially provided to the processing system by downloading it from a remote system through the communication device 164.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

enabling a first user to store a photo in a centrally stored photo archive associated with the first user, by the first user sending the photo in a first message that conforms to an asynchronous messaging protocol for sending person-to-person messages from mobile devices, the first message including the photo and a predetermined indicator and having a telephone number assigned to the first user as a destination telephone number; and enabling a second user operating a mobile device on a wireless network to view the photo, by the second user sending from the mobile device a second message conforming to said protocol, the second message including the same or different predetermined indicator and having the telephone number assigned to the first user as a destination telephone number, in response to which the photo is sent to the mobile device in a third message conforming to said protocol, for output to the second user.

2. A method as recited in claim 1, wherein said protocol is a multimedia messaging system (MMS) protocol, such that the first message, the second message, and the third message are MMS messages.

3. An apparatus comprising:

means for responding to a first multimedia messaging system (MMS) message sent by a first user, the first MMS message including a photo and a predetermined indicator and having a telephone number assigned to the first user as a destination telephone number, by adding the photo to a photo archive associated with the first user; and means for responding to a second MMS message sent by a second user from a mobile device on a wireless network, the second MMS message including the same or different predetermined indicator and having said telephone number assigned to the first user as a destination telephone number, by sending the photo in a third MMS message to the mobile device, for display to the second user.

4. A method comprising:

receiving a first multimedia messaging system (MMS) message sent by a first user from a first mobile device on a wireless network, the first MMS message including a photo, the first MMS message including a predetermined indicator, the first MMS message having a telephone number assigned to the first user as both a source telephone number and a destination telephone number;

in response to detecting the predetermined indicator in the first MMS message, and based on the source telephone number and the destination telephone number of the first MMS message, adding the photo to a centrally stored photo archive associated with the first user, the photo archive containing zero or more photos associated with the first user;

receiving a second MMS message sent by a second user from a second mobile device on a wireless network, the second MMS message for requesting at least the photo, the second MMS message including the same or different predetermined indicator, the second MMS message having a telephone number assigned to the second user as a source telephone number and having the telephone number assigned to the first user as a destination telephone number; and in response to the second MMS message, and based on the destination telephone number of the second MMS message and detection of the same or different predetermined indicator in the second MMS message, retrieving the photo from the photo archive associated with the first user and sending the photo to the second mobile device in a third MMS message.

5. A method as recited in claim 4, further comprising:

determining whether the second MMS message includes a specific identifier of a photo in the photo archive; and if the second MMS message does not include any specific identifier of a photo in the photo archive, retrieving each photo in the photo archive and sending each said photo to the second mobile device in response to the second MMS message.

6. A method as recited in claim 5, wherein, if the second MMS message includes an identifier of a photo in the photo archive, said sending the photo to the second mobile device comprises sending to the second mobile device only each photo in the photo archive for which there is an identifier in the second MMS message.

7. A processing system comprising:

a processor;

a network interface through which to communicate with a plurality of mobile devices; and a memory coupled to the processor, the memory storing instructions which when executed by the processor, cause the processing system to perform a process comprising:

receiving a first multimedia messaging system (MMS) message sent by a first user from a mobile device on a wireless network, the first MMS message for requesting a photo associated with a second user, the first MMS message including a predetermined indicator, the first MMS message having a telephone number assigned to the first user as a source telephone number and having a telephone number assigned to the second user as a destination telephone number; and in response to the first MMS message, and based on the destination telephone number of the first MMS message and detection of the predetermined indicator in the first MMS message, retrieving the photo from a photo archive associated with the second user and sending the photo to the mobile device in a second MMS message;

wherein the photo is stored in the photo archive associated with the second user upon the processing system receiving a third MMS message sent by the second user, the third MMS message including the photo, the third MMS message including the same or different predetermined indicator, the third MMS message having the telephone number assigned to the second user as both a source telephone number and a destination telephone number.

8. The processing system of claim 7, wherein the process further comprises: determining whether the first MMS message includes a specific identifier of a photo in the photo archive; and if the first MMS message does not include any specific identifier of a photo in the photo archive, retrieving each photo in the photo archive and sending each said photo to the mobile device in response to the first MMS message.

9. The processing system of claim 8, wherein, if the first MMS message includes an identifier of a photo archive, said sending the photo to the mobile device comprises sending to the [mobole] *mobile* device only each photo in the photo archive for which there is an identifier in the first MMS message.

10. A *non-transitory* computer readable medium having sequences of instructions stored therein which, when executed by a processor of a computer, cause the processor to perform a process comprising:

receiving a first multimedia messaging system (MMS) message sent by a first user from a first mobile device on a wireless network, the first MMS message including a photo, the first MMS message including a predetermined indicator, the first MMS message having a telephone number assigned to the first user as both a source telephone number and a destination telephone number;

in response to detecting the predetermined indicator in the first MMS message, and based on the source telephone number and the destination telephone number of the first MMS message, adding the photo to a centrally stored photo archive associated with the first user, the photo archive containing zero or more photos associated with the first user;

receiving a second MMS message sent by a second user from a second mobile device on a wireless network, the second MMS message including the same or different predetermined indicator, the second MMS message having a telephone number assigned to the second user as a source telephone number and having the telephone number assigned to the first user as a destination telephone number;

determining whether the second MMS message includes a specific identifier of a photo in the photo archive;

if the second MMS message includes a specific identifier of a photo in the photo archive, in response to the second MMS message, and based on the destination telephone number of the second MMS message and detection of the same or different predetermined indicator in the second MMS message, retrieving a photo from the photo archive associated with the first user and sending the photo to the second mobile device in a third MMS message, wherein the photo is associated with a specific identifier included in the second MMS message; and if the second MMS message does not include any specific identifier of a photo in the photo archive, retrieving each photo in the photo archive and sending each said photo to the second mobile device in response to the second MMS message.

*11. A method comprising:*

*enabling a first user to store a digital content article in a centrally stored digital content article archive associated with the first user, by the first user sending the digital content article in a first message that conforms to an asynchronous messaging protocol for sending person-to-person messages from mobile devices, the first message including the digital content article and a predetermined indicator and having a telephone number assigned to the first user as a destination telephone number; and*

*enabling a second user operating a mobile device on a wireless network to view the digital content article, by the second user sending from the mobile device a second message conforming to said protocol, the second message including the same or different predetermined indicator and having the telephone number assigned to the first user as a destination telephone number, in response to which the digital content article is sent to the mobile device in a third message conforming to said protocol, for output to the second user.*

*12. A method as recited in claim 11, wherein the digital content article is a video.*

*13. A method as recited in claim 11, wherein the digital content article includes a hyperlink.*

*14. A method as recited in claim 11, wherein the third message is a message indicating that access to the digital content article is denied to the second user.*

*15. A method as recited in claim 11, wherein the first message is sent over the internet.*

*16. A non-transitory computer readable medium having sequences of instructions stored therein which, when executed by a processor of a computer, cause the processor to perform a process comprising:*

*receiving a first multimedia messaging system (MMS) message sent by a first user, the first MMS message including a digital content article, the first MMS message including a predetermined indicator, the first MMS message having a telephone number assigned to the first user as both a telephone number and a destination telephone number;*

*in response to detecting the predetermined indicator in the first MMS message, and based on the source telephone number and the destination telephone number of the first MMS message, adding the digital content article to a centrally stored digital content article archive associated with the first user, the digital content article archive containing zero or more digital content articles associated with the first user;*

*receiving a second MMS message sent by a second user from a mobile device on a wireless network, the second MMS message including the same or different predetermined indicator, the second MMS message having a telephone number assigned to the second user as a source telephone number and having the telephone number assigned to the first user as a destination telephone number;*

*determining whether the second MMS message includes a specific identifier of a digital content article in the digital content article archive; and*

*if the second MMS message includes a specific identifier of a digital content article in the digital content article archive, in response to the second MMS message, and based on the destination telephone number of the second MMS message and detection of the same or different predetermined indicator in the second MMS message, retrieving a digital content article from the digital content article archive associated with the first user and sending the digital content article to the mobile device in a third MMS message.*

*17. The process of claim 16, further comprising determining whether the telephone number assigned to the second user is on an access control list,*

*if the telephone number is not on the access control list, sending a third message to the mobile device indicating that access to the digital content article is denied; and*

*if the telephone number is on the access control list, sending the digital content article to the mobile device in the third MMS message.*

*18. A processing system comprising:*

*a processor;*

*a network interface through which to communicate with a plurality of mobile devices; and*

*a memory coupled to the processor, the memory storing instructions which when executed by the processor, cause the processing system to perform a process comprising:*

*enabling a first user to store a digital content article in a centrally stored digital content article archive associated with the first user, by the first user sending the digital content article in a first message that conforms to an asynchronous messaging protocol for sending person-to-person messages from mobile devices, the first message including the digital content article and a predetermined indicator and having a telephone number assigned to the first user as a destination telephone number; and*

*enabling a second user operating a mobile device on a wireless network to view the digital content article, by the second user sending from the mobile device a second message conforming to said protocol, the second message including the same or different predetermined indicator and having the telephone number assigned to the first user as a destination telephone number, in response to which the digital content article is sent to the mobile device in a third message conforming to said protocol, for output to the second user.*

* * * * *